US010210262B2

(12) United States Patent
Konik et al.

(10) Patent No.: US 10,210,262 B2
(45) Date of Patent: Feb. 19, 2019

(54) SYSTEMS AND METHODS TO IDENTIFY A FILTER SET IN A QUERY COMPRISED OF KEYWORDS

(71) Applicant: eBay Inc., San Jose, CA (US)

(72) Inventors: Tolga Konik, Menlo Park, CA (US); Rajyashree Mukherjee, Fremont, CA (US)

(73) Assignee: eBay Inc., San Jose, CA (US)

( * ) Notice: Subject to any disclaimer, the term of this patent is extended or adjusted under 35 U.S.C. 154(b) by 429 days.

(21) Appl. No.: 14/460,728

(22) Filed: Aug. 15, 2014

(65) Prior Publication Data

US 2015/0356187 A1    Dec. 10, 2015

Related U.S. Application Data

(60) Provisional application No. 62/009,817, filed on Jun. 9, 2014.

(51) Int. Cl.
  *G06F 17/30* (2006.01)
  *G06Q 30/06* (2012.01)
  *G06N 7/00* (2006.01)

(52) U.S. Cl.
  CPC .. *G06F 17/30867* (2013.01); *G06F 17/30991* (2013.01); *G06N 7/005* (2013.01); *G06Q 30/0625* (2013.01)

(58) Field of Classification Search
  None
  See application file for complete search history.

(56) References Cited

U.S. PATENT DOCUMENTS 7,428,528 B1   9/2008  Ferrari et al.
7,752,190 B2   7/2010  Skinner
(Continued)

FOREIGN PATENT DOCUMENTS

CN   108140212 A     6/2018
EP    3335132 A1     6/2018
(Continued)

OTHER PUBLICATIONS

"International Application Serial No. PCT/US2015/034954, International Search Report dated Oct. 8, 2015", 2 pgs.
(Continued)

*Primary Examiner* — Apu M Mofiz
*Assistant Examiner* — Farhad Agharahimi
(74) *Attorney, Agent, or Firm* — Shook, Hardy & Bacon L.L.P.

(57) ABSTRACT

Systems and methods to identify a filter set in a keyword query are described. The system receives a query from a client machine. The system identifies filter sets based on the query and a based on rules. The filter sets include a first filter set that includes a first filter. The rules are utilized to associate at the least one keyword from the query to the first filter. The system further scores the filter sets based on probabilities to generate scores. The probabilities describe occurrences of attribute-value pairs in listings that respectively describe items that were previously transacted on a network-based marketplace. The system further identifies the first filter set from the filter sets based on the scores, generates a user interface including search results that are identified based on the identified first filter set, and communicates the user interface, over the network, to the client machine.

15 Claims, 32 Drawing Sheets

(56) References Cited

U.S. PATENT DOCUMENTS

| | | | |
|---|---|---|---|
| 7,831,476 B2 | 11/2010 | Foster et al. | |
| 7,996,282 B1* | 8/2011 | Scott | G06Q 30/06 705/27.1 |
| 8,438,069 B2 | 5/2013 | Chong et al. | |
| 8,874,566 B2 | 10/2014 | Robert | |
| 8,954,422 B2 | 2/2015 | Hasan et al. | |
| 8,996,495 B2 | 3/2015 | Rehman | |
| 9,104,718 B1 | 8/2015 | Levy et al. | |
| 9,703,875 B2 | 7/2017 | Konik et al. | |
| 9,959,351 B2 | 5/2018 | Konik et al. | |
| 2001/0034694 A1 | 10/2001 | Elias | |
| 2002/0065762 A1 | 5/2002 | Lee et al. | |
| 2003/0217052 A1* | 11/2003 | Rubenczyk | G06F 17/30643 |
| 2004/0260621 A1 | 12/2004 | Foster et al. | |
| 2006/0253423 A1 | 11/2006 | McLane et al. | |
| 2007/0185847 A1 | 8/2007 | Budzik et al. | |
| 2009/0125482 A1 | 5/2009 | Peregrine et al. | |
| 2009/0293007 A1 | 11/2009 | Duarte et al. | |
| 2010/0079677 A1 | 4/2010 | Matsubara et al. | |
| 2010/0082410 A1 | 4/2010 | Baudin et al. | |
| 2010/0241639 A1 | 9/2010 | Kifer et al. | |
| 2012/0036123 A1 | 2/2012 | Hasan et al. | |
| 2012/0089914 A1 | 4/2012 | Holt et al. | |
| 2012/0102040 A1 | 4/2012 | Battle et al. | |
| 2012/0109788 A1 | 5/2012 | Mohan | |
| 2012/0117072 A1* | 5/2012 | Gokturk | G06Q 30/0278 707/740 |
| 2012/0278127 A1 | 11/2012 | Kirakosyan et al. | |
| 2013/0173370 A1 | 7/2013 | Schory et al. | |
| 2014/0156669 A1 | 6/2014 | Bati et al. | |
| 2014/0244550 A1 | 8/2014 | Jin et al. | |
| 2015/0052020 A1 | 2/2015 | Raman et al. | |
| 2015/0066674 A1 | 3/2015 | Liu et al. | |
| 2015/0154251 A1 | 6/2015 | Cockcroft et al. | |
| 2015/0193674 A1 | 7/2015 | Ishiguro | |
| 2015/0356186 A1 | 12/2015 | Konik et al. | |
| 2015/0356188 A1 | 12/2015 | Konik et al. | |
| 2017/0046764 A1 | 2/2017 | Konik et al. | |
| 2017/0206578 A9 | 7/2017 | Konik et al. | |
| 2017/0300587 A1 | 10/2017 | Konik et al. | |

FOREIGN PATENT DOCUMENTS

| | | |
|---|---|---|
| WO | WO-2015191622 A1 | 12/2015 |
| WO | WO-2017031002 A1 | 2/2017 |

OTHER PUBLICATIONS

"International Application Serial No. PCT/US2015/034954, Written Opinion dated Oct. 8, 2015", 9 pgs.

"U.S. Appl. No. 14/460,690, Non Final Office Action dated Sep. 26, 2016", 11 pgs.

"U.S. Appl. No. 14/460,690, Response filed Dec. 27, 2016 to Non Final Office Action dated Sep. 26, 2016", 11 pgs.

"U.S. Appl. No. 14/460,767, Non Final Office Action dated Nov. 15, 2016", 10 pgs.

"International Application Serial No. PCT/US2015/034954, International Preliminary Report on Patentability dated Dec. 22, 2016", 8 pgs.

"International Application Serial No. PCT/US2016/046894, International Search Report dated Oct. 26, 2016", 2 pgs.

"International Application Serial No. PCT/US2016/046894, Written Opinion dated Oct. 26, 2016", 5 pgs.

"U.S. Appl. No. 14/460,690, Notice of Allowance dated Mar. 1, 2017", 7 pgs.

"U.S. Appl. No. 14/460,767, Examiner Interview Summary dated Mar. 23, 2017", 4 pgs.

"U.S. Appl. No. 14/460,767, Final Office Action dated May 18, 2017", 12 pgs.

"U.S. Appl. No. 14/460,767, Response filed Mar. 15, 2017 to Non Final Office Action dated Nov. 15, 2016", 14 pgs.

Advisory Action received for U.S. Appl. No. 14/460,767, dated Sep. 1, 2017, 3 pages.

Notice of Allowance received for U.S. Appl. No. 14/460,767, dated Nov. 20, 2017, 8 pages.

Notice of Allowance received for U.S. Appl. No. 14/460,767, dated Mar. 13, 2018, 7 pages.

Response to Final Office Action filed on Aug. 18, 2017 for U.S. Appl. No. 14/460,767 dated May 18, 2017, 14 pages.

Final Office Action received for U.S. Appl. No. 14/827,196, dated Aug. 3, 2018, 26 pages.

Non-Final Office Action received for U.S. Appl. No. 14/827,196, dated Jan. 22, 2018, 16 pages.

Response to Non-Final Office Action filed on Apr. 23, 2018, for U.S. Appl. No. 14/827,196, dated Jan. 22, 2018, 20 pages.

Afrahim et al.,"Dribble-Carousel UI Design", Retrieved from the Internet URL:<https://dribbble.com/hots/946583-Carousei-U1-Design>, Feb. 17, 2013, 5 pages.

Fahim, "A Sophisticated B2B Ecommerce Portal", Retrieved from the Internet URL:<https://dribbble.comshots/1726195-A-sophisticated-B2B-ecommerce-portal>, Sep. 15, 2014, 8 pages.

Vlad, "Responsive Zen Cart Themes Settings and Features", Retrieved from the Internet URL: <http://blog.12leaves.com/2013/05/01/business-responsive-zen-cart-theme-is-released/>, May 1, 2013, 3 pages.

International Preliminary Report on Patentability received for PCT Application No. PCT/US2016/046894, dated Mar. 1, 2018, 7 pages.

* cited by examiner

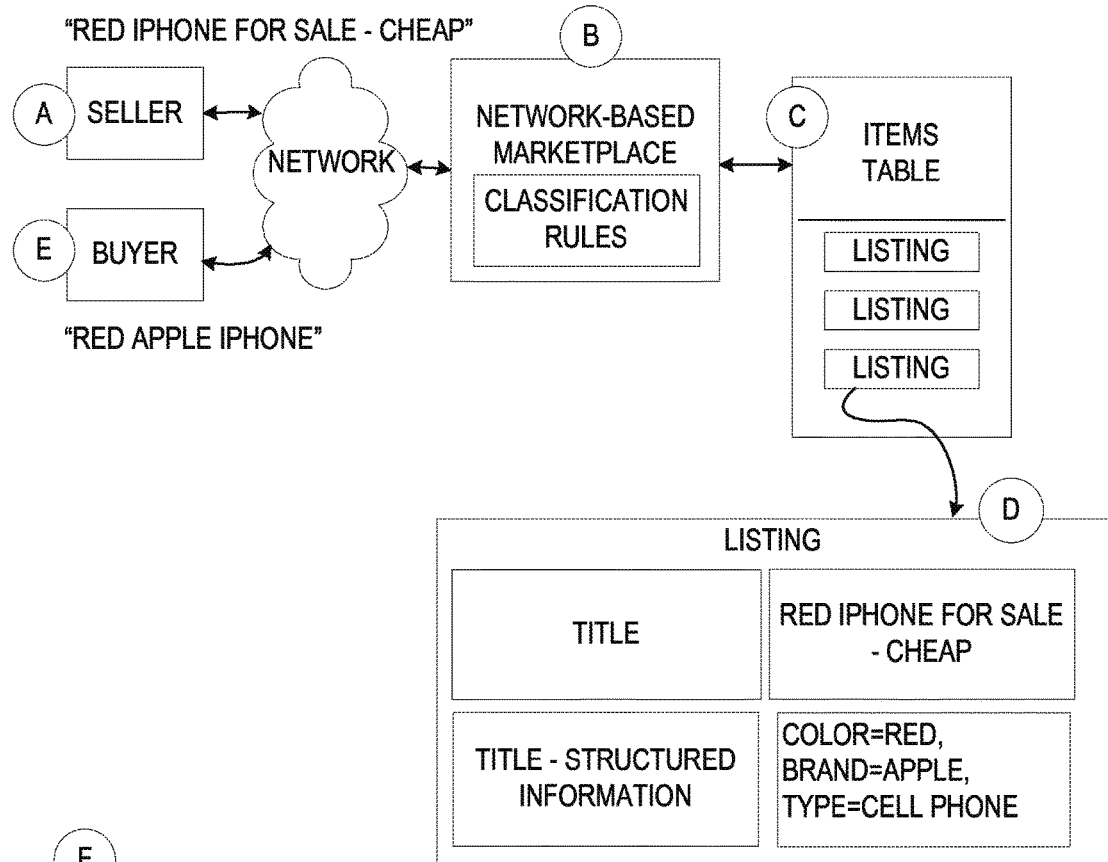
FIG. 1A
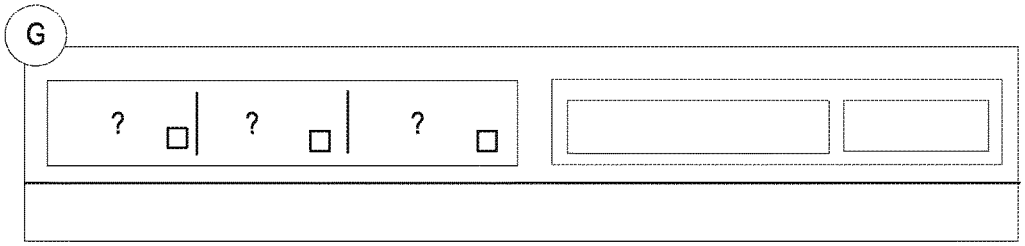

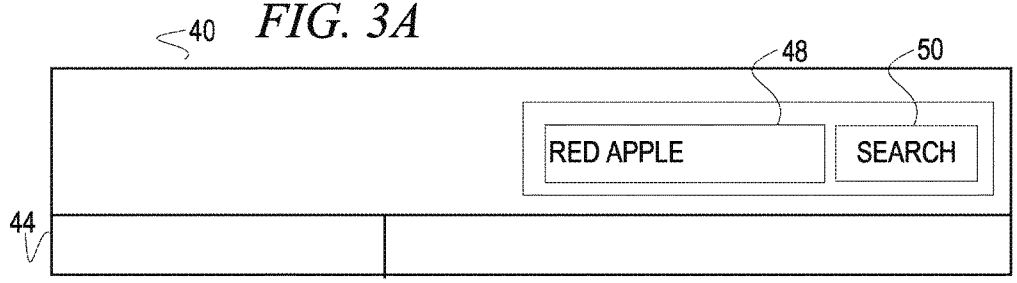

FIG. 3C

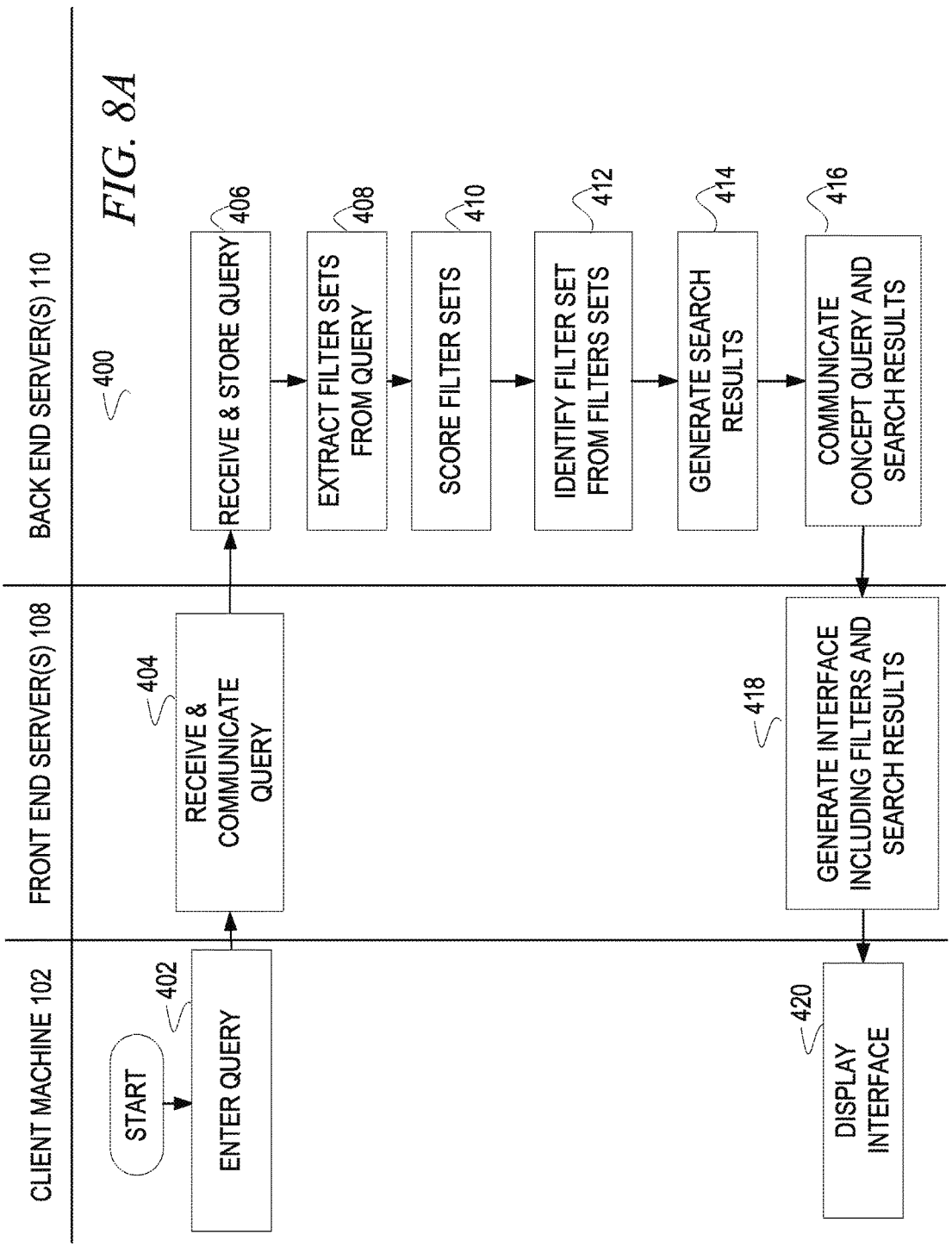

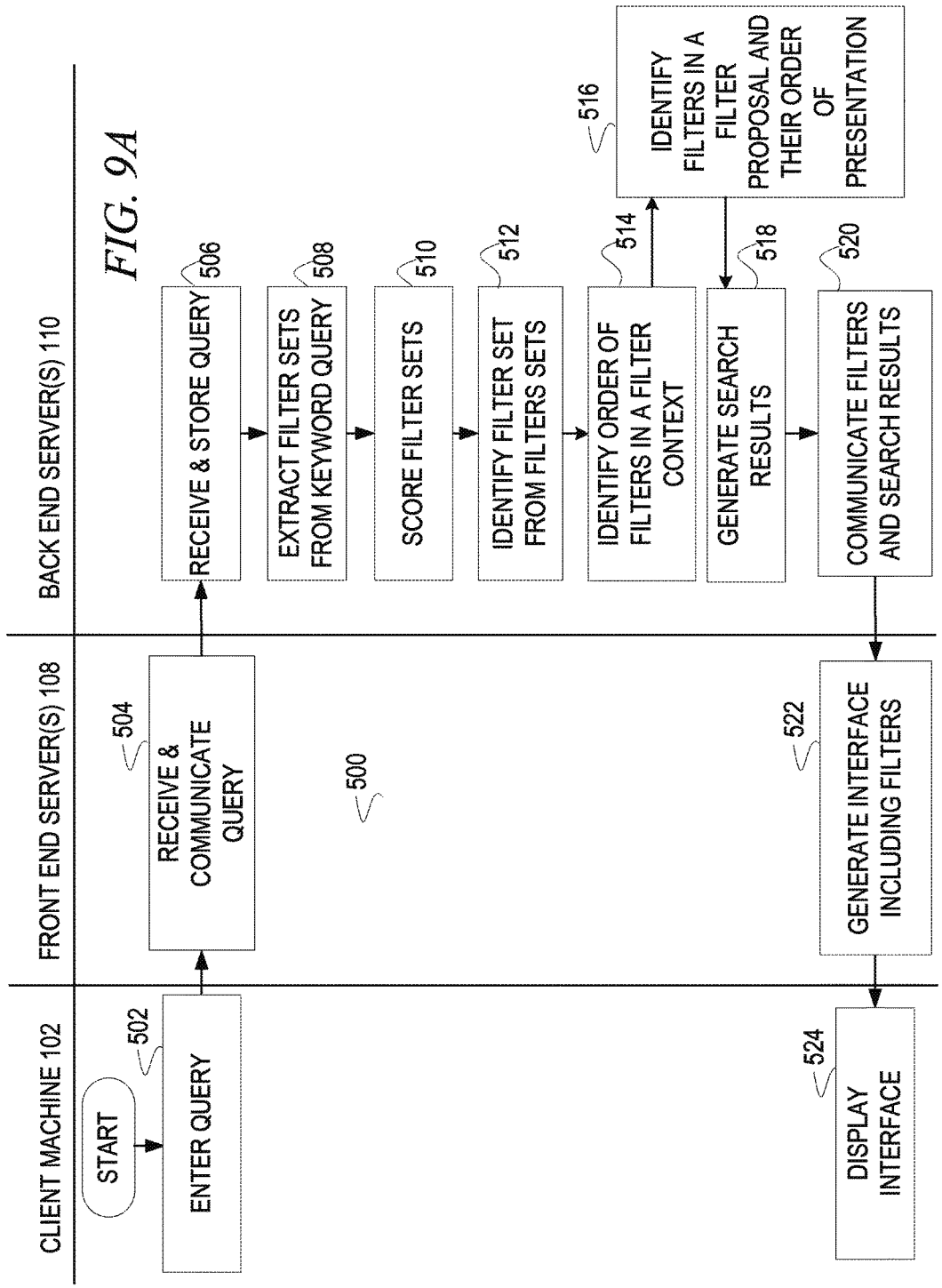

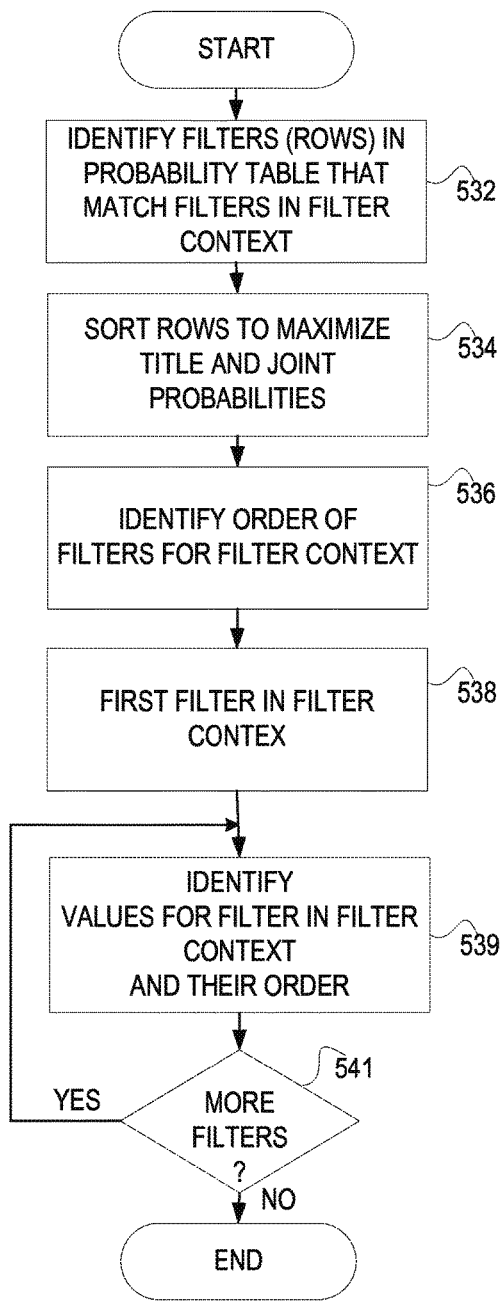
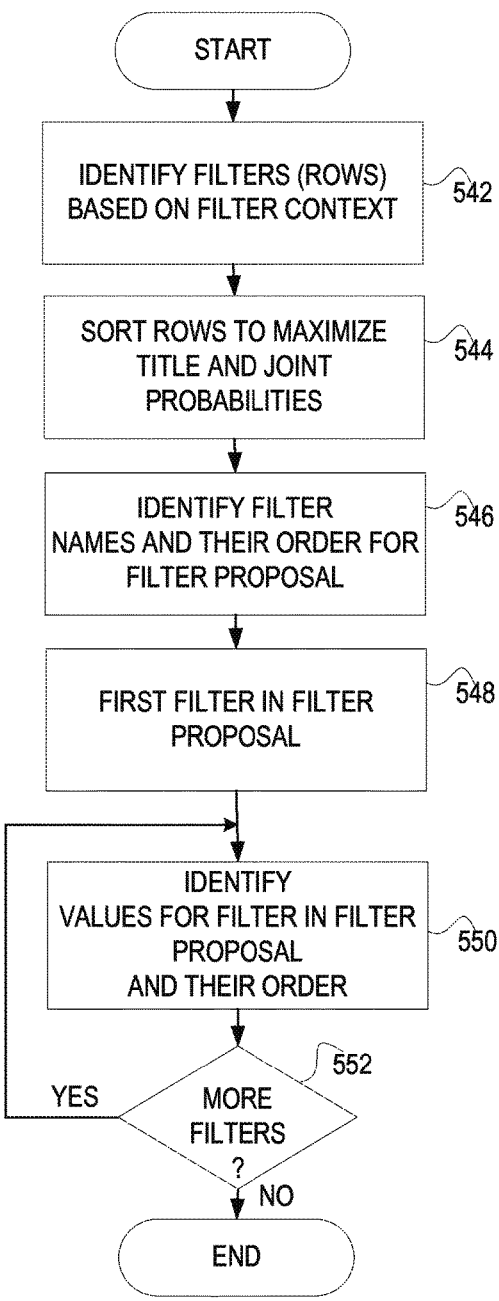

*FIG. 9D*

TABLE 1

| ROW | FILTER 66 | | JOINT PROBABILITY 218 "BRAND=APPLE" | JOINT PROBABILITY 218 "TYPE=IPHONE" |
|---|---|---|---|---|
| | ATTRIBUTE 166 (E.G., FILTER NAME) | VALUE 168 | | |
| 1 | "TYPE" | "CELL PHONE" | 1% | 2% |
| 2 | "TYPE" | "ACCESSORY" | 1% | 3% |
| 3 | "CONDITION" | "NEW" | 3% | 2% |
| 4 | "TYPE" | "GREEN" | 1% | 3% |
| 5 | "COLOR" | "RED" | 1% | 3% |
| 6 | "CONDITION" | "USED" | 1% | 3% |

TABLE 2

| ROW | FILTER 66 | | JOINT PROBABILITY 218 "BRAND=APPLE" | JOINT PROBABILITY 218 "TYPE=IPHONE" |
|---|---|---|---|---|
| | ATTRIBUTE 166 (E.G., FILTER NAME) | VALUE 168 | | |
| 1 | "TYPE" | "CELL PHONE" | 1% | 2% |
| 3 | "CONDITION" | "NEW" | 3% | 2% |
| 5 | "COLOR" | "RED" | 1% | 3% |

FIG. 9F

TABLE 3

| ROW | FILTER 66 | | JOINT PROBABILITY 218 "BRAND=APPLE" | JOINT PROBABILITY 218 "TYPE=IPHONE" |
|---|---|---|---|---|
| | ATTRIBUTE 166 (E.G., FILTER NAME) | VALUE 168 | | |
| 1 | "COLOR" | "RED" | | 2% |
| 2 | "SHIPPING" | "STANDARD" | 1% | 3% |
| 3 | "SHIPPING" | "EXPEDITED" | 3% | 2% |
| 4 | "COLOR" | "GREEN" | 1% | 3% |
| 5 | "COLOR" | "BLUE" | 1% | 3% |
| 6 | "CONDITION" | "USED" | 1% | 3% |

TABLE 4

| ROW | FILTER 66 | | JOINT PROBABILITY 218 "BRAND=APPLE" | JOINT PROBABILITY 218 "TYPE=IPHONE" |
|---|---|---|---|---|
| | ATTRIBUTE 166 (E.G., FILTER NAME) | VALUE 168 | | |
| 1 | "COLOR" | "RED" | 0% | 2% |
| 4 | "COLOR" | "GREEN" | 1% | 3% |
| 5 | "COLOR" | "BLUE" | 1% | 3% |

FIG. 9G

TABLE 5

| ROW | FILTER 66 | | JOINT PROBABILITY 218 "BRAND=APPLE" | JOINT PROBABILITY 218 "TYPE=IPHONE" |
|---|---|---|---|---|
| | ATTRIBUTE 166 (E.G., FILTER NAME) | VALUE 168 | | |
| 4 | "COLOR" | "GREEN" | 1% | 3% |
| 5 | "COLOR" | "BLUE" | 1% | 3% |

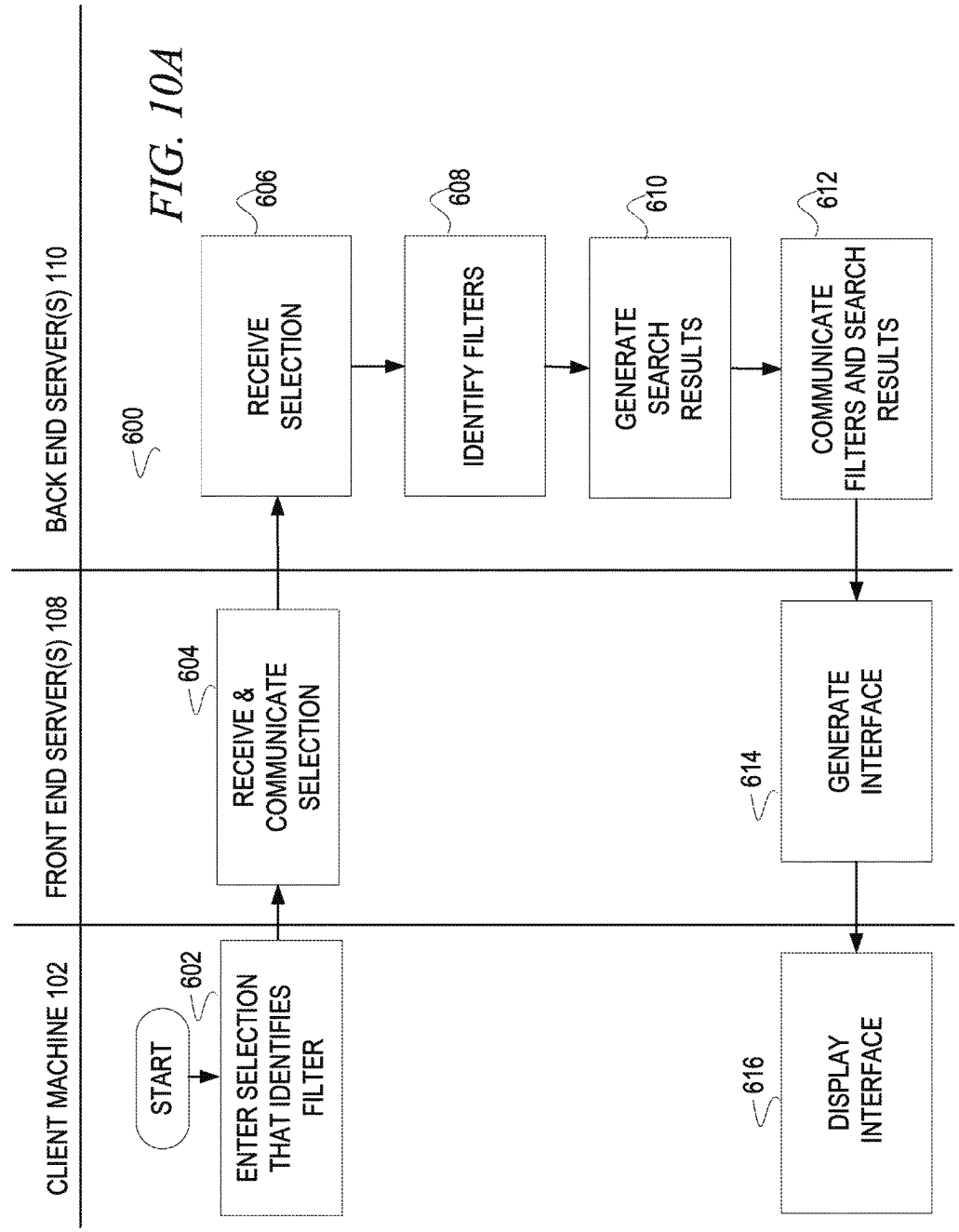

SYSTEMS AND METHODS TO IDENTIFY A FILTER SET IN A QUERY COMPRISED OF KEYWORDS

RELATED APPLICATIONS

This application claims the priority benefits of U.S. Provisional Application No. 62/009,817, filed Jun. 9, 2014 which is incorporated in its entirety by reference.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

BRIEF DESCRIPTION OF DRAWINGS

Various ones of the appended drawings merely illustrate example embodiments of the present invention and cannot be considered as limiting its scope.

FIG. 1A illustrates a system to identify a filter set in a query comprised of keywords, according to an embodiment;

FIGS. 3A-3C illustrate user interfaces, according to an embodiment;

FIG. 8A illustrates a method to identify a fitter set in a query comprised of keywords;

FIG. 9A illustrates a method to identify and present filters, according to an embodiment;

FIG. 9B illustrates a method to identify an order of filters in a filter context, according to an embodiment;

FIG. 9C illustrates a method to identify filters in a filter proposal and their order of presentation, according to an embodiment;

FIG. 9D illustrates Tables 2, according to an embodiment;

FIG. 9F illustrates Tables 3-4, according to an embodiment;

FIG. 9G illustrates Table 5, according to an embodiment;

FIG. 10A illustrates a method to identify, values for a selected filter, according to an embodiment;

DETAILED DESCRIPTION

Figure 1B:
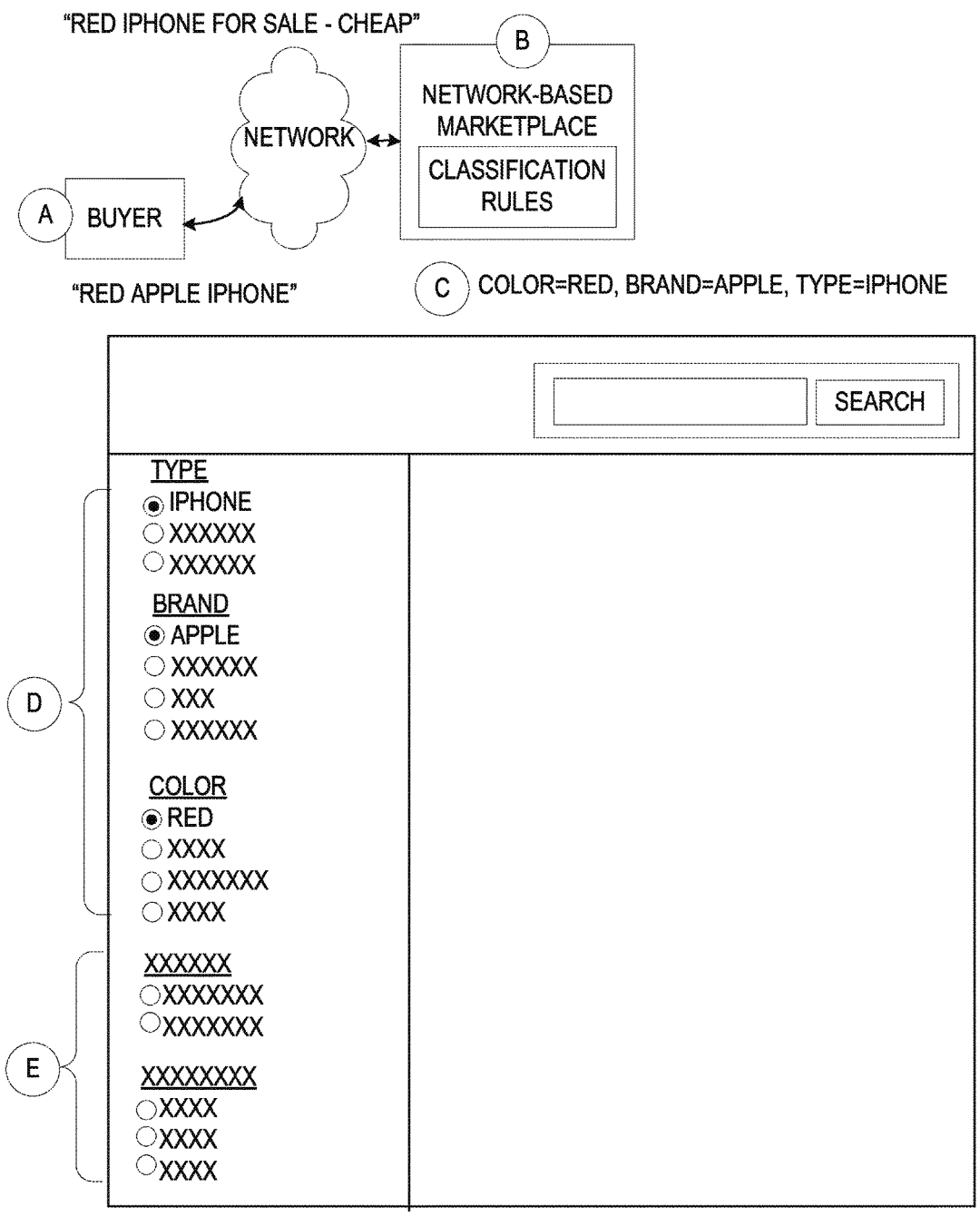
FIG. 1B illustrates a system to identify and present filters, according to an embodiment.

The description that follows includes systems, methods, techniques, instruction sequences, and computing machine program products that embody illustrative embodiments of the present invention. In the following description, for purposes of explanation, numerous specific details are set forth in order to provide an understanding of an embodiment of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1A illustrates a first aspect of the present disclosure in the form of a system 10 to identify a filter set in a query comprised of keywords, according to an embodiment. The system 10 may receive a query, identify multiple filter sets in the query based on the keywords in the query, score each filter set, identify a filter set with a highest score, and utilize the filter set with the highest score to identify listings (e.g., search results) that describe items for sale on a network-based marketplace. A filter set may be comprised of filters that are further comprised of attribute-value pairs. The system 10 may identify one filter set from another based on probabilities that describe occurrences of attribute-value pairs in listings that describe previously transacted items on a network-based marketplace. Accordingly, the system 10 may select from competing interpretations of the query based on the popularity of attribute-value pairs in previously transacted listings. Broadly, consider a seller who lists an item for sale on a network-based marketplace and a buyer who enters a query that is received by the network-based marketplace and processed to return search results. For example, FIG. 1A illustrates an operation "A," where a seller, who is operating a client machine, may enter information describing an item that is communicated over a network to the network-based marketplace. At operation "B," the network-based marketplace may receive and store the information in a listing in an items table. For example, the network-based marketplace may receive and store a title "RED IPHONE FOR SALE—CHEAP" in a listing in the items table. At operation "C," the network-based marketplace may further apply classification rules to the title to, at operation "D," generate structured information in the form of attribute-value pairs. For example, the network-based marketplace may apply classification rules to keywords that comprise the title in the listing to identify the attribute-value pairs, COLOR=RED, BRAND=APPLE, and TYPE=CELL PHONE. The network-based marketplace may structure keywords in the title to identify different meanings. Consider, in another example, the word "apple" does not signify a brand, but rather, a fruit. That is, the word "apple" in the title of a listing (e.g., APPLE ORCHARD FOR SALE—EXPENSIVE BUT HIGHLY DESIRABLE) may have a different meaning (e.g., FRUIT=APPLE). Also, consider that the network-based marketplace may identify multiple filter sets for the same keywords in a query.

Returning to FIG. 1A, at operation "E," a buyer may enter the query "RED APPLE IPHONE" that, in turn, is received by the network-based marketplace that, in turn, applies the classification rules to the query to identify four filter sets at operation "F." At operation "G," the network-based marketplace may identify one fitter set from the four filter sets for display to the seller as an interpreted meaning of the query "RED APPLE IPHONE." The system 10 may identify one filter set from multiple possible sets by scoring each of the filter sets based on probabilities that describe occurrences of attribute-value pairs in listings that describe items previously transacted on a network-based marketplace (e.g., completed listings), as described further below. That is, each filter set may be scored based on probabilities of each fitter, as an attribute value-pair, occurring in the title of completed listings and based on probabilities of each filter, as an attribute-value pair, co-occurring in the completed listings with each of the other filters in the filter set. Finally, at operation "G," the network-based marketplace may filter the listings in the items table based on a highest scoring filter set to generate search results for communication to the client machine that is operated by the seller. Accordingly, the system 10 may select a most popular filter set from a set of filter sets based on the occurrence of attribute-value pairs in listings that were previously transacted on the network-based marketplace.

FIG. 1B illustrates a second aspect of the present disclosure in the form of a system 20 to identify and present filters, according to an embodiment. Broadly, consider a buyer who, at operation "A," enters the query "RED APPLE IPHONE" that may be communicated over a network and received by a network-based marketplace. At operation "B." the network-based marketplace may apply the classification rules to the query to generate, at operation "C," a filter context in the form of a set of filters "COLOR=RED," "BRAND=APPLE," and "TYPE=IPHONE." At operation "D," the network-based marketplace may identify an order of presentation (e.g., "TYPE=IPHONE," "BRAND=APPLE," and "COLOR=RED") for the filters on a user interface. Further, at operation "E," the system 20 may identify and present a filter proposal in the form of a second set of filters, including their order for presentation on a user interface. The system 20 may identify the filters in the filter proposal and their order of presentation based on the filters in the filter context and probabilities that describe occurrences of attribute-value pairs (e.g., filters) in listings that describe items previously transacted on the network-based marketplace (e.g., completed listings). That is, each filter in the filter proposal and its order of presentation may be determined based on a probability of the filter, as an attribute value-pair, occurring in the completed listings and on probabilities of the filter, as an attribute-value pair, co-occurring in the completed listings with each of the other filters in the filter context. Finally, the system 20 may generate a user interface including search results identified based on the filter context and communicate the user interface, over the network, to the client machine.

Figure 1C:
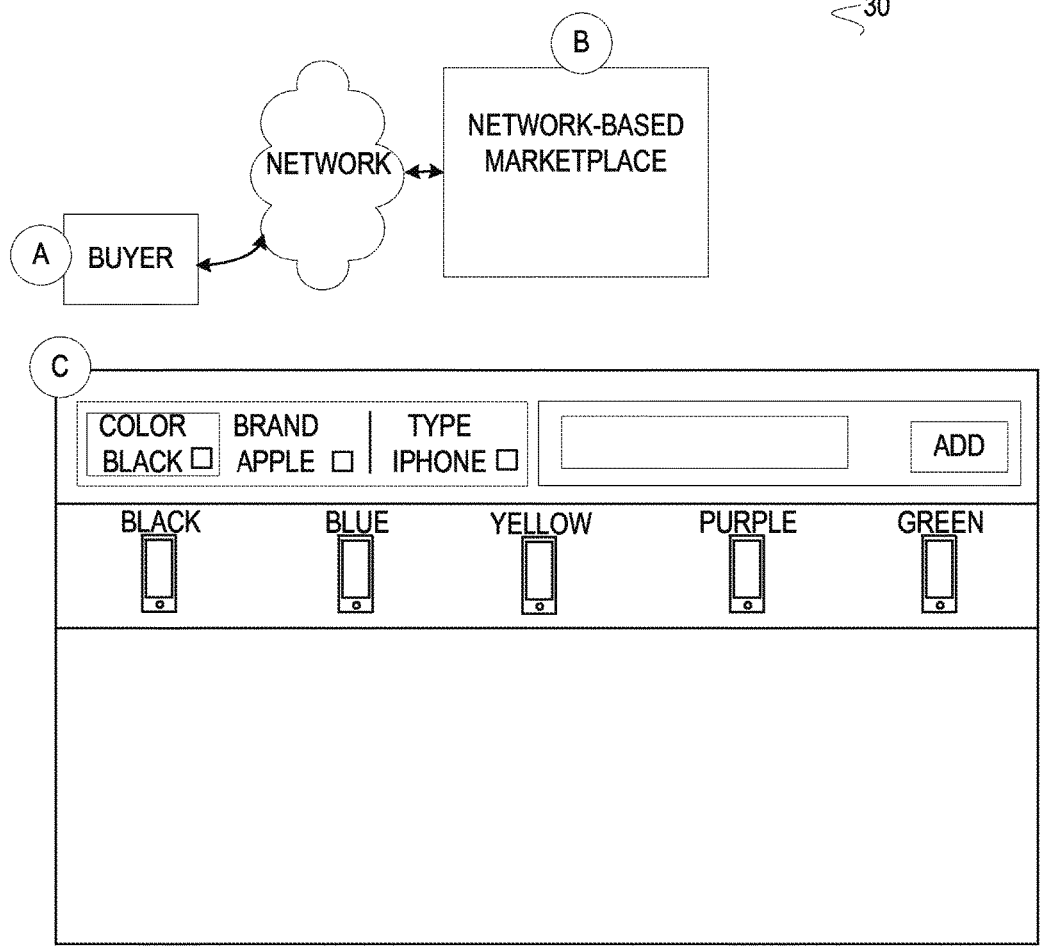
FIG. 1C illustrates a system to identify and present values for filters, according to an embodiment.

FIG. 1C illustrates a third aspect of the present disclosure in the form of a system 30 to identify values for a selected filter, according to an embodiment. Broadly, consider a buyer who, at operation "A," selects the filter "COLOR=BLACK" to update the filter "COLOR=RED" in a concept query (not shown) "COLOR=RED," "BRAND=APPLE," "TYPE=IPHONE." The selection may be communicated over a network and received by the network-based marketplace. At operation "B" the network-based marketplace may identify a set of fitters based on the filter name "COLOR" and the other fitters in the concept query (e.g., "BRAND=APPLE," "TYPE=IPHONE"), identify an order of their presentation, generate a user interface, and communicate the user interface, at operation "C," over the network, back to the client machine. Accordingly, the user interface may include the updated concept query (e.g., "COLOR=BLACK," "BRAND=APPLE," "TYPE=IPHONE"), a set of values (e.g., "BLUE," "YELLOW," "PURPLE," "GREEN") for the identified set of filters in the indicated order, and search results including listings (not shown) that are identified based on the concept query, as illustrated in FIG. 1C. Note that the value "BLACK" is positioned first in the set of values because it was selected by the user. The system 30 may identify the filters, including their values and their order of presentation, based on the concept query and based on probabilities describing occurrences of attribute-value pairs (e.g., filters) in listings that respectively describe items that were previously transacted on a network-based marketplace (e.g., completed listings). That is, each value (e.g., "BLUE," "YELLOW," "PURPLE," "GREEN") in a filter and its order of presentation may be determined based on a probability of the filter, as an attribute value-pair, occurring in the title of the completed listings and based on probabilities of the filter, as an attribute-value pair, co-occurring in the completed listings with each of the other filters (e.g., "BRAND=APPLE," "TYPE=IPHONE") in the concept query.

Figure 1D:
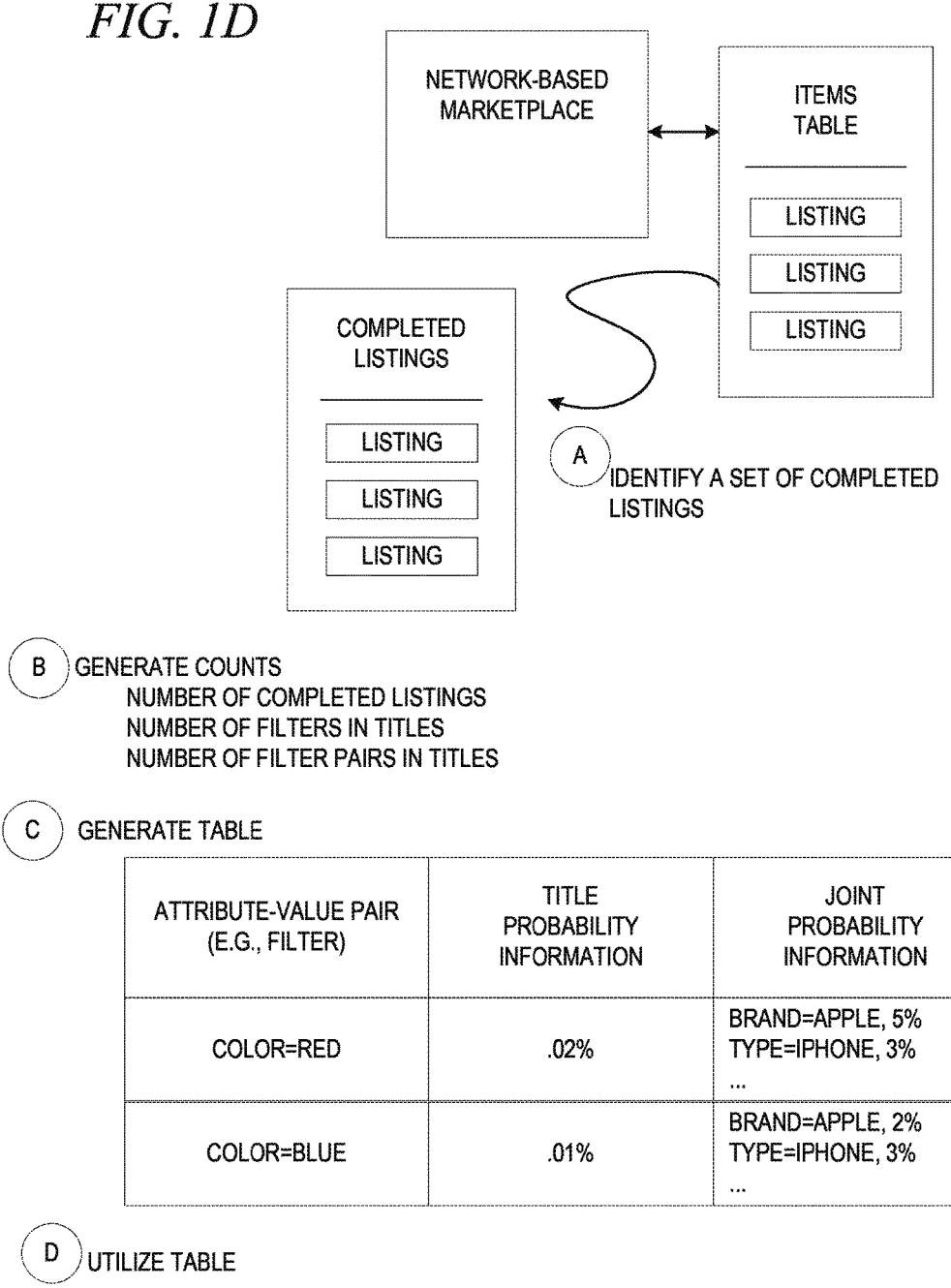
FIG. 1D illustrates a schematic of a generation of a popularity according to an embodiment.

FIG. 1D illustrates a schematic of a generation of a popularity table, according to an example embodiment. The popularity table may be utilized to 1) identify one filter set from multiple filter sets that are identified based on a keyword query, as illustrated in FIG. 1A; 2) identify one or more filters from multiple filters and their order of presentation based on an identified filter set (e.g., concept query/filter context), as illustrated in FIG. 1B; and 3) identify one or more filters and their associated values from multiple filters and the order of the presentation, as illustrated in FIG.

1C. The popularity table may be utilized by the above features because it presents for immediate real-time access probabilities of occurrences of attribute-value pairs (e.g., filters) in the titles of listings previously transacted in the network-based marketplace (e.g., completed listings) and probabilities of co-occurrences of pairs of attribute-value pairs (e.g., filters) in the titles of listings previously transacted in the network-based marketplace (e.g., completed listings). The former probability is referred to throughout this document as title probability. The latter probability is referred to throughout this document as joint probability.

Broadly, a combination of off-line and on-line steps may be utilized to generate the popularity table and to make it accessible to the above features. At operation "A," a popularity module may sample "completed listings" from an items table. A "completed listing" may be a listing that describes an item (e.g., good or service) that was sold (e.g., purchased/won an auction). For example, the popularity module may execute on the network-based marketplace to sample listings that were completed (e.g., sold) at a time that occurs during a predetermined period including a start-time and an end-time. Next, at operation "B," the popularity module may count the number of completed listings (e.g., ten-thousand listings), the number attribute-value pairs (e.g., filters) according to unique attribute-value pairs (e.g., two-hundred listings with titles including the attribute-value pair COLOR=RED, two-hundred listings with titles including the attribute-value pair COLOR=BLUE) in the titles of the listings, and the number of pairs of attribute-value pairs (e.g., filter-fitter) according to one attribute-value pair co-occurring with another attribute-value pair (e.g., ten listings including titles including the pair of attribute-value pairs "COLOR=RED" and "BRAND=APPLE" (e.g., 10/200=5%)) in the titles of the listings. Next, at operation "C," the popularity module may generate the popularity table such that each row corresponds to an attribute-value pair (e.g., filter). That is, a row may include the attribute-value (e.g., filter), a title probability (e.g., percentage of listings including titles including the attribute-value pair for the row) and one or more co-occurrence of probabilities for pairs of attribute-value pairs including the attribute-value-pair designated for the row (e.g., filter) and another attribute-value pair (co-occurrence attribute-value pair). The size of joint probability information is not prohibitive because the probability of most pairs of filters (e.g., filter attribute-value pair and co-occurrence attribute-value pair) is zero. Finally, at operation "D," the network-based marketplace may utilize the popularity table to identify a filter set, identify one or more filters and their order of presentation, and identify one or more filter values and their order of presentation, as described above and throughout this document.

Figure 2A:
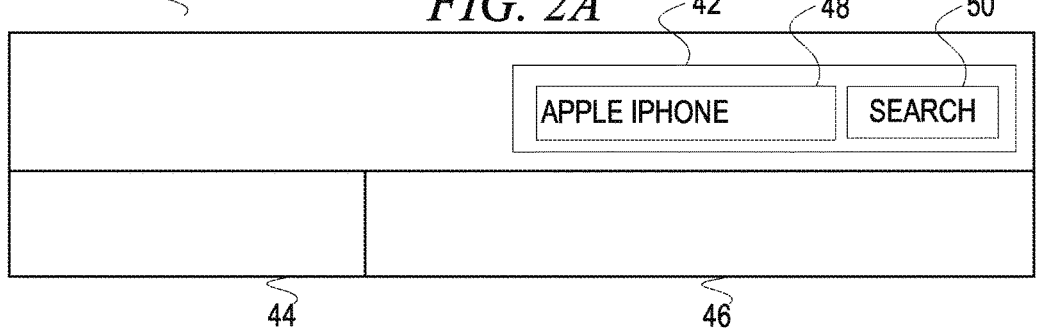
FIGS. 2A-2D illustrate user interfaces, according to an embodiment.

FIG. 2A illustrates a user interface 40, according to an embodiment, with navigation panel 44. The user interface 40 may include a query panel 42, a navigation panel 44, and a search result panel 46. The query panel 42 may include an input box 48 that is utilized to receive a query. The query may include keywords or other keyboard characters. The query may be received responsive to receiving a selection of a search user interface element 50. Receipt of the query may override the previous query. The navigation panel 44 may be utilized to display filters (not shown) (described later) that are identified based on the query. The search result panel 46 may be utilized to display search results (not shown) including descriptions of items that are published on a network-based marketplace.

Figure 2B:
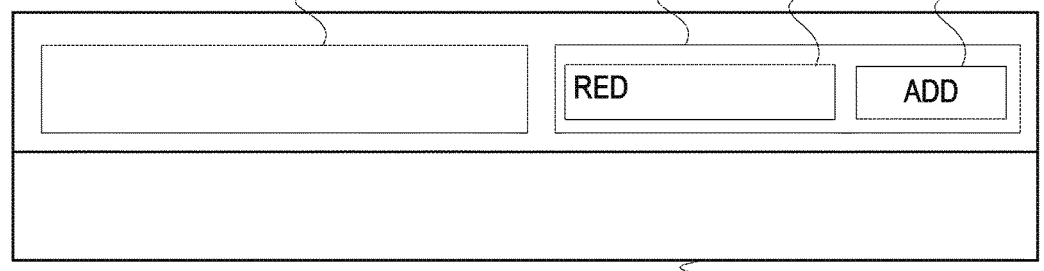
Figure 2C:
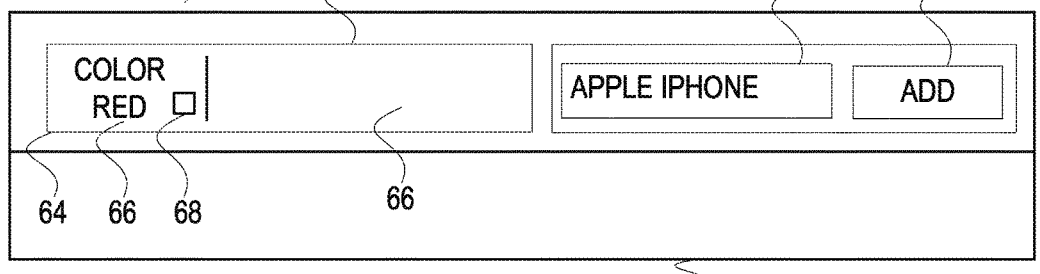
Figure 2D:
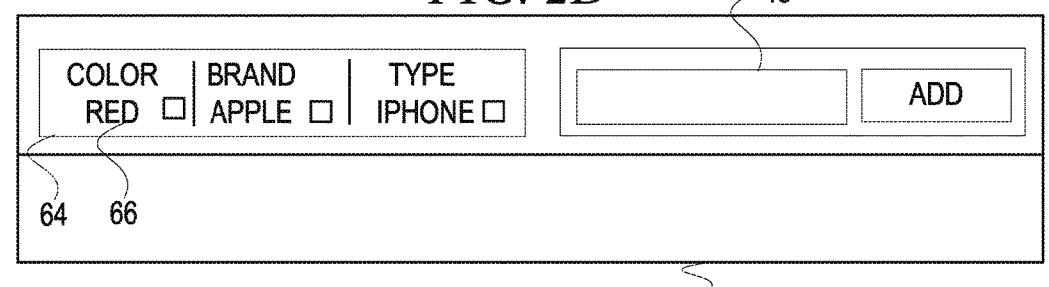

FIGS. 2B-2D illustrates a user interface 60, according to an embodiment, to process a query interactively. The three figures illustrate a sequential processing of a query. FIG. 2B illustrates the user interface 60, according to an embodiment, to process a query interactively. The user interface 60 may include a query panel 42, a concept query panel 62, and a search result panel 46. The query panel 42 may be utilized to receive a query that was entered into an input box 48. The query may include keywords and/or other keyboard characters. The user interface element 63 may be used to add the query. For example, the input box 48 may include a query or a query segment that is received responsive to receiving a selection of a user interface element 63. The query (e.g., "RED") may be parsed to identify one or more filters that are displayed in the concept query panel 62. The search result panel 46 may be utilized to display search results (e.g., descriptions of listings) that are identified based on a concept query (not shown) in the concept query panel 62.

FIG. 2C illustrates the user interface 60, according to an embodiment, to process a query interactively. The user interface 60 illustrates processing of the query "RED" to identify a filter 66 (e.g., COLOR=RED) now displayed as a concept query 64. Each filter 66 in the concept query 64 may be associated with a filter removal checkbox 68. The filter removal checkbox 68 may be selected to selectively remove a filter 66 from the concept query 64. The input box 48 is illustrated to show a query segment "APPLE IPHONE." Responsive to receipt of a selection of the user interface element 63, the query segment may be parsed to identify one or more filters 66 that are added to the concept query 64. The search result panel 46 may be utilized to display search results that are identified based on the concept query (e.g., COLOR=RED).

FIG. 2O illustrates the user interface 60, according to an embodiment, to process a query interactively. The user interface 60 is illustrated to demonstrate a previous entry of the query segments "RED" and "APPLE IPHONE" into the input box 48, a parsing of the query "RED" to identify a first filter 66 (e.g., COLOR=RED) and a parsing of the query segment "APPLE IPHONE" to identify a second filter 66 (e.g., BRAND=APPLE) and a third filter 66 (e.g., TYPE=IPHONE) to generate the concept query 64 (e.g., COLOR=RED, BRAND=APPLE, TYPE=IPHONE). The search result panel 46 may be utilized to display search results (not shown) that are identified based on the concept query 64 (e.g., COLOR=RED, BRAND=APPLE, TYPE=IPHONE).

Figure 3C:
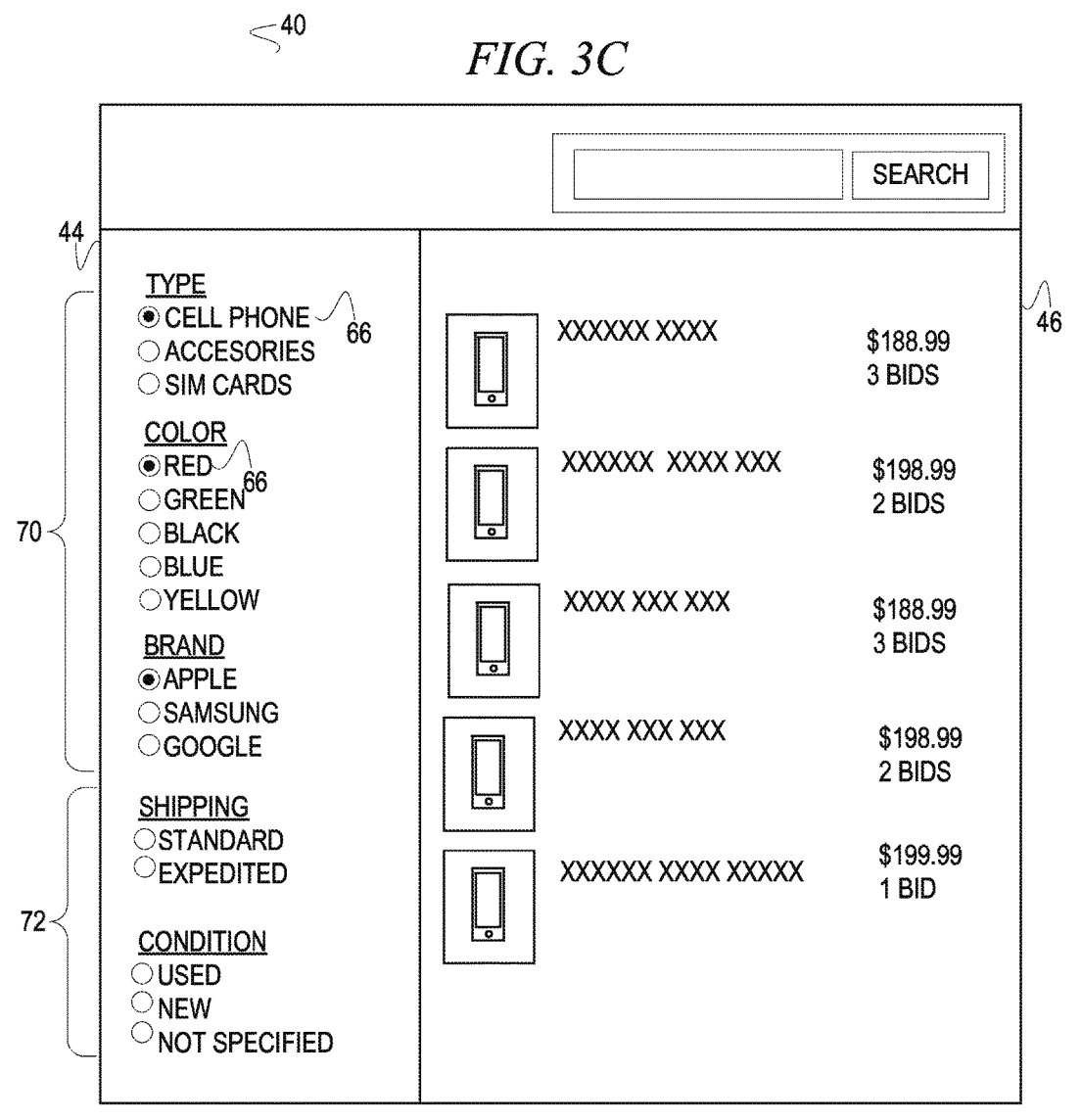

FIG. 3A illustrates the user interface 40, according to an embodiment, with a navigation panel 44. The user may enter the query "RED APPLE" into the input box 48 and select the user interface element 50. Responsive to the selection of the user interface element 50, the network-based marketplace may receive the selection and the query "RED APPLE" and parse the query to identify a filter set in the form of a filter context including a first filter in the form of the filter 66, (e.g., COLOR=RED), and a second filter in the form of the filter 66 (e.g., BRAND=APPLE). Next, the network-based marketplace may identify an order of presentation for the filters 66 in the filter context, identify a second set of filters in the form of a filter proposal, and identify an order of presentation for the filters in the filter proposal. Finally, the network-based marketplace may generate a user interface 40, and communicate the user interface 40 to a client machine, as illustrated in FIG. 3B. The filter context and the filter proposal may be displayed in the navigation panel 44, as illustrated in FIG. 3B.

FIG. 3B illustrates the user interface 40, according to an embodiment, with the navigation panel 44. The user interface 40, as illustrated, was generated in accordance with the operations described in FIG. 3A. The user interface 40 may include the navigation panel 44 and the search result panel 46. The navigation panel 44 may include a filter context 70 including two filters 66 (e.g., COLOR=RED, BRAND=APPLE) and a filter proposal 72 including three attributes (e.g., TYPE, CONDITION, ITEM LOCATION) each in association with a set of values that may respectively be combined with the corresponding attribute to form an attribute-value pair (e.g., fitter 66). The filter context 70 may be identified and the order of the filters 66 for the filter context 70 may be identified based on the query and the popularity table (not shown), as described later in this document. The filter proposal 72 includes one or more filters 66 that may be identified based on the filter context 70 and a popularity table (not shown), as described later in this document. Further, an order of presentation of the filters 66 in the filter proposal 72 may be identified based on the filter context 70 and the popularity table (not shown), as described later in this document. The search result panel 46 may include descriptions of listings that were identified based on the filter context 70, as previously described. Each listing description may describe an item that is being offered for sale via purchase or auction and may include an image, a title, a description, number of bids, and the highest bid for auction. Other embodiments of the user interface 40 may include other information.

LAG. 3C illustrates the user interface 40, according to an embodiment, with the navigation panel 44. The user interface 40, as illustrated, was generated in accordance with the operations described in FIG. 3A and FIG. 3B. The user interface 40 illustrates the selection of the value "CELL PHONE" in association with the attribute "TYPE" to generate the filter 66 "TYPE=CELL PHONE" for addition to the filter context 70. Responsive to the updating of the filter context 70, the network-based marketplace may further update the navigation panel 44 and the search result panel 46. For example, the navigation panel 44 may be updated based on the new filter context 70 to change the order of the presentation of the filters 66 in the filter context 70, select a different set of attributes for the filter proposal 72, and select a different order of presentation of attributes for the filter proposal 72. In addition, the values that are associated with the attributes to form filters 66 may be selected and ordered in a manner that is similar to the above described selection of fitters 66. For example, the values associated with the filter 66 "TYPE=CELL PHONE" in the filter context 70 and their order of presentation may be identified based on the filter context 70 (e.g., "TYPE=CELL PHONE," "COLOR=RED" and "BRAND=APPLE") and the popularity table, as described later in this document. Further for example, the values associated with the filter 66 "COLOR=RED" in the filter context 70 and their order of presentation may be identified based on the filter context 70 (e.g., "TYPE=CELL PHONE," "COLOR=RED" and "BRAND=APPLE") and the popularity table, as described later in this document. Further for example, the values associated with the filter 66 "BRAND=APPLE" in the filter context 70 and their order of presentation may be identified based on the filter context 70 (e.g., "TYPE=CELL PHONE," "COLOR=RED" and "BRAND=APPLE") and the popularity table, as described later in this document. Further for example, the values (e.g., "STANDARD," "EXPEDITE") associated with the attribute "SHIPPING" in the filter proposal 72 and their order of presentation may be identified based on the filter context 70 (e.g., "TYPE=CELL PHONE," "COLOR=RED" and "BRAND=APPLE") and the popularity table, as described later in this document. Finally for example, the values (e.g., "USED," "NEW," "NOT SPECIFIED") associated with the attribute "CONDITION" in the filter proposal 72 and their order of presentation may be identified based on the filter context 70 (e.g., "TYPE=CELL PHONE," "COLOR=RED" and "BRAND=APPLE") and the popularity table, as described later in this document.

Figure 4A:
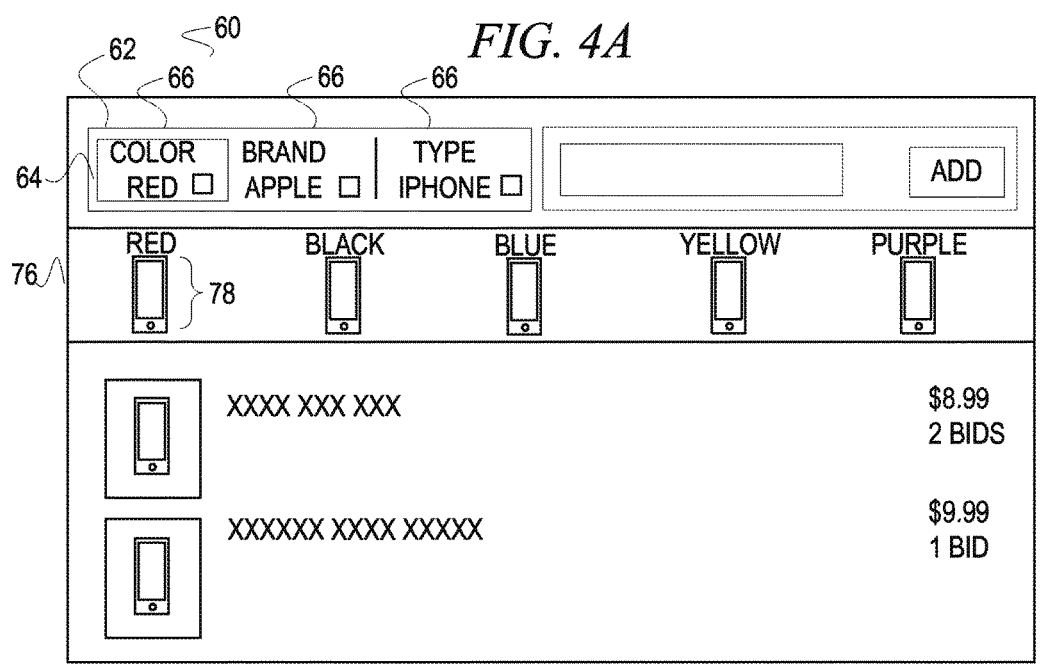
FIGS. 4A-4B illustrate user interfaces, according to an embodiment.

FIG. 4A illustrates a user interface 60, according to an embodiment, to process a query interactively. The user interface 60 may include the concept query 64 that was identified based on a query. The concept query 64 is illustrated as including three filters 66 including "COLOR=RED," "BRAND=APPLE" and "TYPE=IPHONE." The user interface 60 may include a value panel 76. Other than the value "RED," the value panel 76 may include values that are identified based on the concept query 64. Specifically, values other than "RED," may be identified based on the filter BRAND=APPLE, the filter "TYPE=IPHONE," the attribute "COLOR," and the popularity table. Further, the values, other than "RED," (e.g., "BLACK," "BLUE," "YELLOW," and "PURPLE") are presented from left to right in an order that is identified based on the filter 66 "BRAND=APPLE," the filter 66 "TYPE=IPHONE," the attribute "COLOR," and the popularity table. In addition, each of the values is associated with an image 78 that is identified based on the respective values (e.g., "RED," "BLACK," "BLUE," "YELLOW," and "PURPLE"), the selected attribute (e.g., "COLOR"), and the remaining filters 66 in the concept query 64 (e.g., "BRAND=APPLE" and "TYPE=IPHONE"), as described later in this document. The user interface 60 may include search results.

Figure 4B:
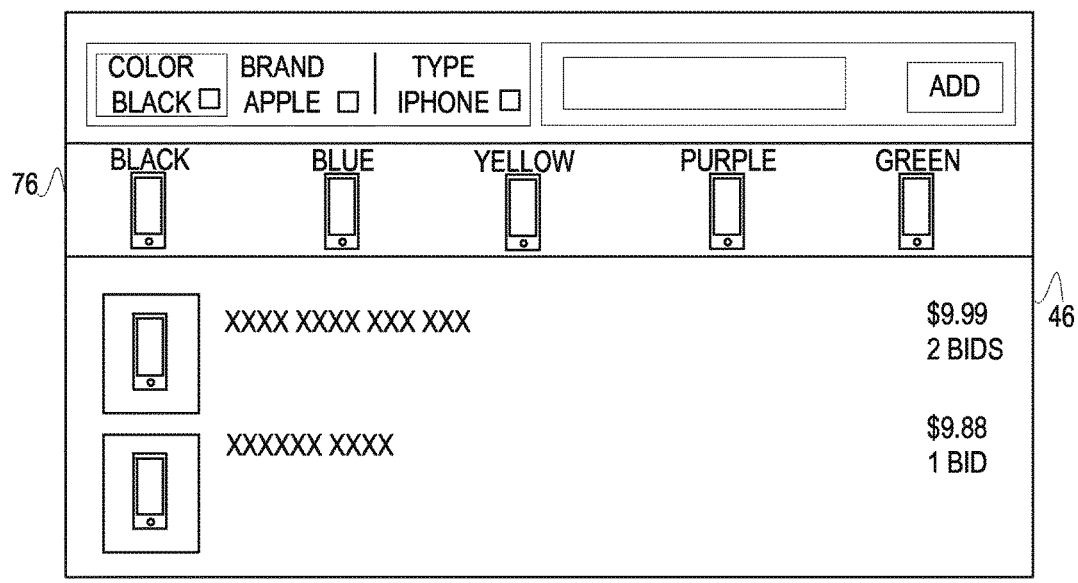

FIG. 4B illustrates the user interface 60, according to an embodiment, to process a query interactively. The user interface 60 may be updated with respect to the concept query 64, the value panel 76, and the search results panel 46. For example, the user interface 60 in FIG. 4B may be updated responsive to the network-based marketplace receiving a selection of the value "BLACK" in the value panel 76 as illustrated in FIG. 4A. Returning to FIG. 4B, the concept query 64 may be updated to replace the filter "COLOR=RED" with the filter 66 "COLOR=BLACK." The value panel 76 may be updated to replace the value "RED" with the value "BLACK." Further, the value panel 76 may be updated to include values that are identified based on the filter "BRAND=APPLE," the fitter "TYPE=IPHONE," the attribute "COLOR," and the popularity table. Further, the values, other than "BLACK," (e.g., "BLUE," "YELLOW," "PURPLE," and "GREEN") are presented from left to right in an order that is identified based on the filter 66 "BRAND=APPLE," the filter 66 "TYPE-IPHONE," the attribute "COLOR," and the popularity table. In addition, each of the values is associated with an image 78 that is identified based on the respective value (e.g., "BLACK," "BLUE," "YELLOW," "PURPLE," and "GREEN"), the selected attribute (e.g., "COLOR"), the remaining filters 66 in the concept query 64 (e.g., "BRAND=APPLE" and "TYPE=IPHONE") and the popularity table, as described later in this document. The search results panel 46 may be updated to include search results that are identified based on the concept query 64.

Figure 5:
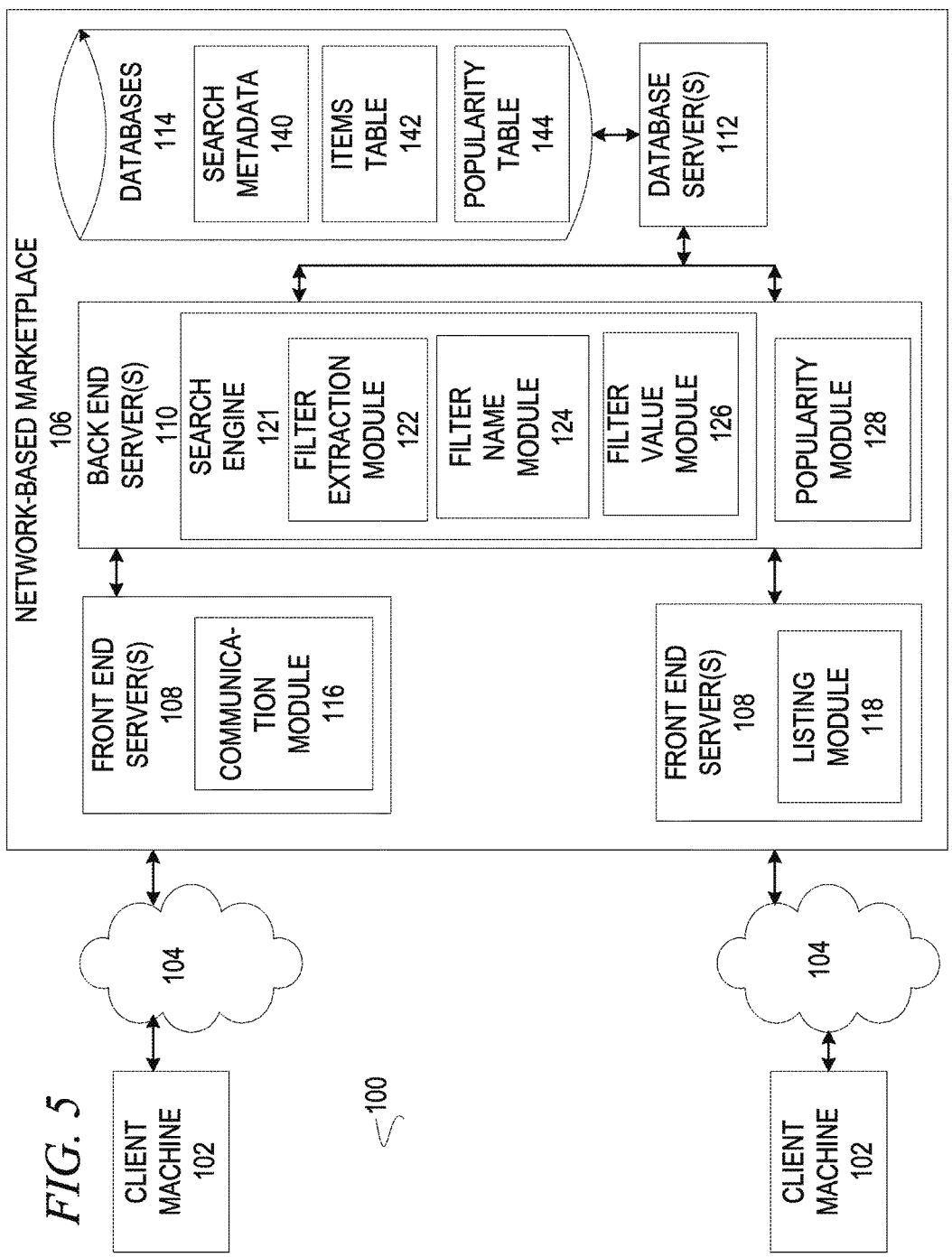
FIG. 5 illustrates an environment in which example embodiments may be implemented, according to an embodiment.

FIG. 5 illustrates a system 100, according to an embodiment. The system 100 may be used to implement any of the methods, features, or structures described in the present application. The system 100 may include client machines 102 that are coupled over a network 104 with a network-based marketplace 106. The client machines 102 may include handheld devices, desktop computers or any other electronic device capable of electronic communication. The network 104 may include a telephone network, a telephone cellar network, the Internet, a wireless network, or any combination thereof. The network 104 may support analogue and/or digital communications over local, mid-range, or wide area distances. The network-based marketplace 106 may include any electronic marketplace (e.g., eBay, Amazon, etc.) for buyers and sellers that enable the transaction of goods and/or services. The network-based marketplace 106 may include front-end servers 108, back-end servers 110, database servers 112, and databases 114. The client machines 102 may communicate over the network 104 with the front-end server(s) 108 that, in turn, communicate with the back-end server(s) 110 that, in turn, communicate with database server(s) 112, which store data to the database(s) 114 and retrieve data from database(s) 114.

The front-end server(s) 108 may include a communication module 116 and a listing module 118. The listing module 118 may receive requests from the client machine 102 that are operated by users (e.g., sellers) before communicating responses back to the users. The requests may include information including text or images for publication in a listing that describes items that are being offered for sale on the network-based marketplace 106. The text may be parsed based on rules to structure the information. For example, a classification rule may include condition information and supplemental information. The condition information may be applied to the title of a listing, or any other part of the listing, to identify matching keywords. Responsive to identification of a match, the listing may be supplemented (e.g., tagged) with the supplemental information. For example, if a title of a listing includes a word "RED" that matches the condition information "RED" then the listing module 118 may tag (e.g., concatenate) the listing with the supplemental information "COLOR=RED." The communicating module 116 may receive requests from the client machine 102 that are operated by users (e.g., buyers) and communicate responses back to the users. The requests may include queries, query segments, selections that identify filters, selections that identify values of filters, and other information. The responses to the requests may include user interfaces including status on the requests, the concept query panels 62, the navigation panels 44, the search result panels 46, and other information.

The back-end servers 110 may include a search engine 121 and a popularity module 128. The search engine 121 may include a filter extraction module 122, a filter name module 124, and a filter value module 126. The search engine 121 may process search requests, filter selections, and other search related requests. The search engine 121 may invoke the filter extraction module 122, responsive to receiving a query, with a query or query segment. The filter extraction module 122 may extract filter sets from the query based on classification rules, score the filter sets based on a popularity table 144, and identify a filter set (e.g., the concept query 64/filter context 70) from the filters sets based on a highest score, as discussed later in this document. The filter name module 124 may receive one or more filters 66 (e.g., the concept query 64/filter context 70) and identify one or more filters based the popularity table 144. The filter value module 126 may receive one or more filters 66 and a filter name (e.g., attribute) to identify one or more filters 66, respectively including values (e.g., RED, GREEN, BLUE, etc.), based on the popularity table 144. The popularity module 128 may be utilized to generate the popularity table 144 (see FIG. 7). The databases 114 may include search metadata 140, an items table 142, and the popularity table 144. The search metadata 140 may store classification rules and other information used to generate structured information (e.g., the filters 66, attribute-value pairs) based on a listing, a query, or a query segment. The filters 66 that are extracted from a query are attribute-value pairs and, accordingly, may be utilized to match the attribute-value pairs in a listing to generate search results. The items table 142 may be used to store listings that describe items tier sale on the network-based marketplace 106. The popularity table 144 may be generated from a set of completed listings that are extracted from the items table 142 based on criteria included in a predetermined period of time. The popularity table 144 may include rows that correspond to attribute-value pairs/filters 66. Each row (e.g., attribute-value pair/filter 66) may include probability information that describes the popularity of the attribute-value pair/filter 66 in a set of completed listings.

Figure 6A:
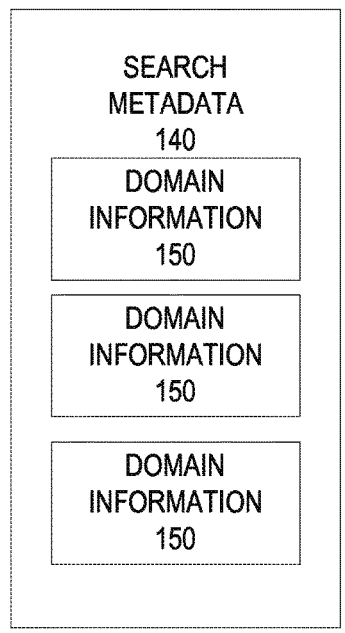
FIG. 6A illustrates search metadata, according to an embodiment.

FIG. 6A illustrates the search metadata 140, according to an embodiment. The search metadata 140 may include multiple entries of domain information 150. The search metadata 140 describes a set of domains that may be utilized to classify listings, describing items being offered for sale on a network-based marketplace 106. A domain may be nested inside of another domain. For example, the domains "home," "Electronics," "Cell Phone & Accessories" and "Popular Brands" telescope down to a leaf category that includes the domains "Popular Brands," "Electronics," "Cell phone & Accessories." That is, the domain "home" includes the domain "Electronics," which includes the domain "Cell Phone & Accessories," which includes the domain "Popular Brands," which includes listings that describe items for sale on the network-based marketplace 106. It will further be appreciated that a domain may include more than one domain.

Figure 6B:
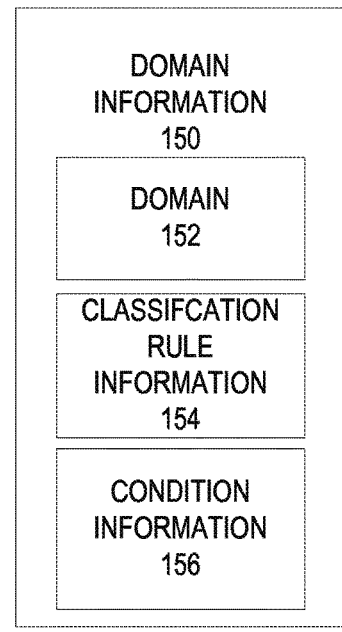
FIG. 6B illustrates domain information, according to an embodiment.

FIG. 6B illustrates the domain information 150, according to an embodiment. The domain information 150 may include a domain 152 (e.g., "home," "Electronics," "Television Sets" "Cell Phone & Accessories," "Popular Brands" etc.), classification rule information 154, and condition information 156. The classification rule information 154 may include a set of classification rules that are associated with the domain 152. The condition information 156 may include one or more Boolean tests that may evaluate TRUE or FALSE. In the present context, the condition information 156 may be utilized to identify the associated domain 152. For example, the domain 152 "automobiles" may include condition information 156 to test for the phrase "FORD RANGER" (e.g., if "FORD RANGER"). That is, if the string "FORD RANGER" is matched, then assert TRUE for the domain 152 of "automobiles." Other tests may be appropriate for other domains 152 (e.g., toys, phones).

Figure 6C:
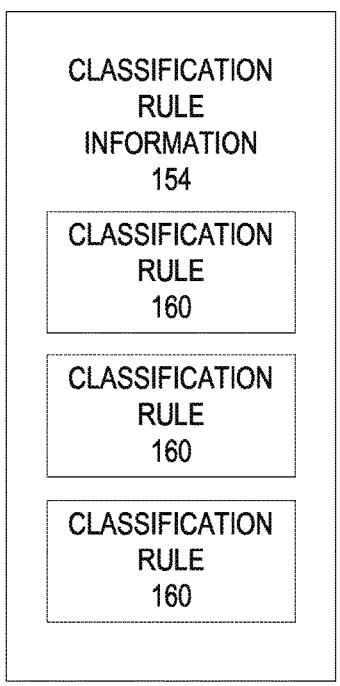
FIG. 6C illustrates classification rule information, according to an embodiment.

FIG. 6C illustrates the classification rule information 154, according to an embodiment. The classification rule information 154 may include multiple entries of classification rules 160. The classification rules 160 may be utilized to structure text in a query, query segment, or listing.

Figure 6D:
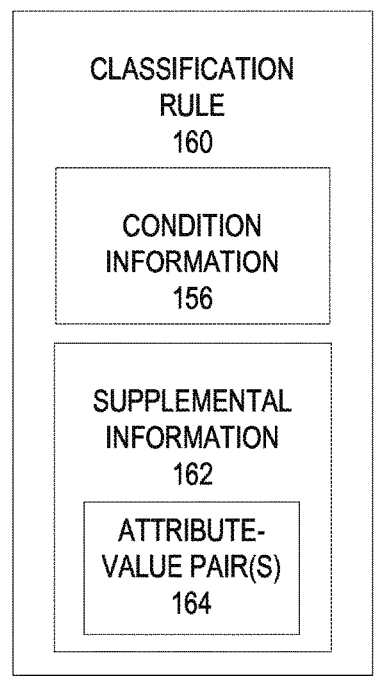
FIG. 6D illustrates a classification rule, according to an embodiment.

FIG. 6D illustrates the classification rule 160, according to an embodiment. The classification rule 160 may include condition information 156, as previously described, and supplemental information 162. The supplemental information 162 may be utilized responsive to the condition information 156 evaluating TRUE. For example, the condition information 156 may include the Boolean test, "if 'RED.'" The condition information 156 may be applied to an identified target (e.g., title in listing, description in listing, query, query segment, etc.) Further for example, the condition information 156 may include the Boolean test, "if 'APPLE IPHONE'." The supplemental information 162 may be utilized to supplement a listing with an attribute-value pair, the concept query 64 with the filter 66, or the filter context 70 with the filter 66 responsive to the condition information 156 evaluating TRUE.

Figure 6E:
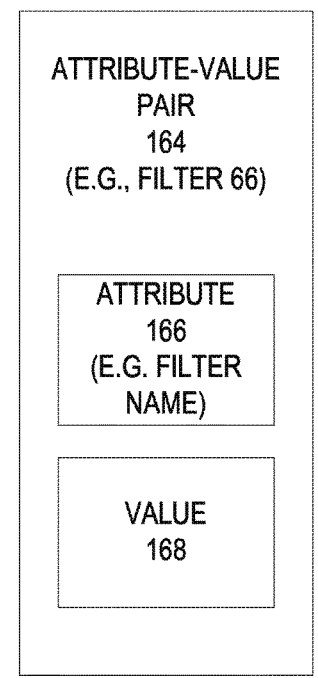
FIG. 6E illustrates an attribute-value pair, according to an embodiment.

FIG. 6E illustrates an attribute-value pair 164, according to an embodiment. The attribute-value pair 164 (e.g., "COLOR=RED") may include an attribute 166 (e.g., "COLOR") and a value 168 (e.g., "RED"). The attribute-value pair 164 may describe an item that is described in a listing 170 (shown in FIG. 6F). The attribute-value pair 164 may function as the filter 66 to identify the listing(s) 170 in the items table 142. The attribute 166 may function as a filter name for the filter 66. The value 168 may correspond to the attribute 166 and functions to materialize the attribute 166. For example, the attribute 166 "COLOR" corresponds to and materializes the values 168 "BLUE," "RED," "GREEN," and so forth.

Figure 6F:
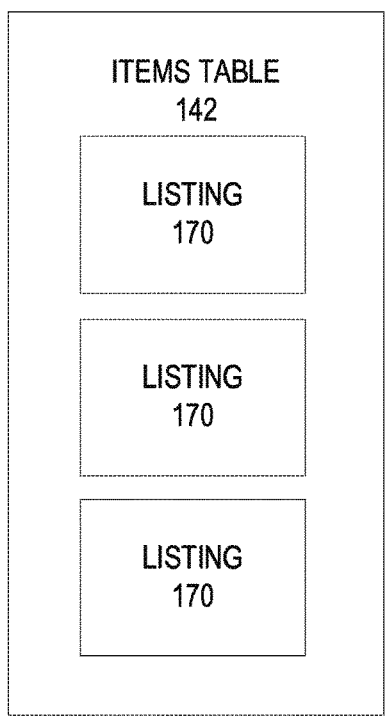
FIG. 6F illustrates an items table, according to an embodiment.

FIG. 6F illustrates the items table 142, according to an embodiment. The items table 142 may include the listings 170 that are published on the network-based marketplace 106.

Figure 6G:
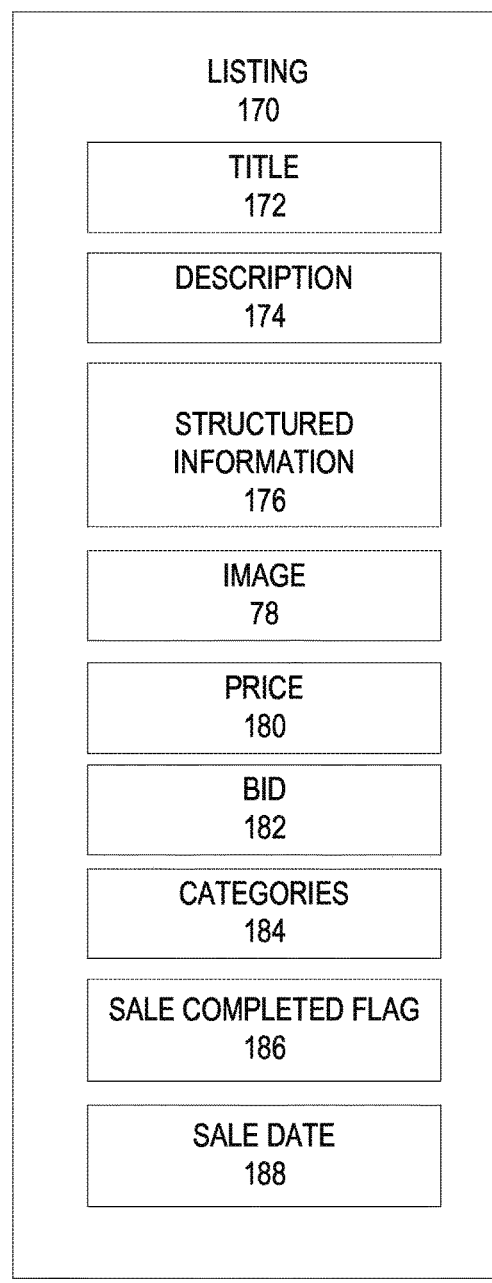
FIG. 6G illustrates a listing, according to an embodiment.

FIG. 6G illustrates the listing 170, according to an embodiment. The listing 170 may describe an item that is offered for sale on the network-based marketplace 106. The listing 170 may include a title 172, a description 174, structured information 176, an image 78 of the item that may be uploaded by the seller, a price 180 to purchase the item that may be configured by the seller, a bid 182 being the current highest bid for the item, one or more categories 184 (e.g., domain(s) 152) where the listing 170 may be found by a user in a navigable hierarchy of categories, a sale completed flag 186, and sale date 188. The title 172 may be a title of the listing 170 and may appear in bold in search results. The title 172 and the description 174 may be received from the seller. The structured information 176 may include one or more attribute-value pairs 164. The structured information 176 may be automatically generated by the network-based marketplace 106 based on the title 172 or the description 174 based on the classification rules 160. The structured information 176 may further be identified based on a selection received from a user (e.g., seller). The sale completed flag may be asserted TRUE responsive to the sale (e.g., purchased, won in an auction) of the item described by the listing 170, registering the listing 170 as completed. The sale date 188 is the date the sale was completed.

Figure 6H:
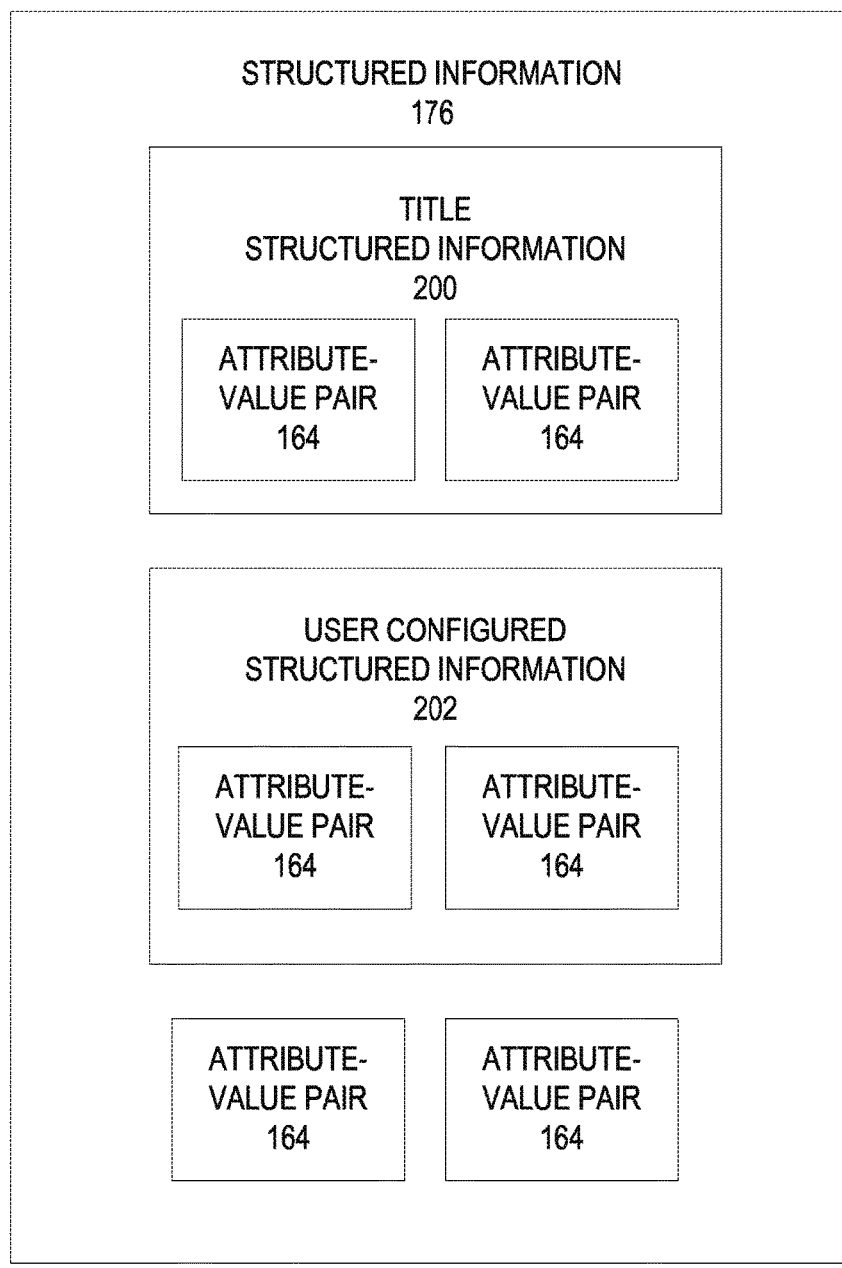
FIG. 6H illustrates structured information, according to an embodiment.

FIG. 6H illustrates structured information 176, according to an embodiment. The structured information 176 may include title structured information 200 including one or more attribute-value pairs 164 and user configured structured information 202 including one or more attribute-value pairs 164. The one or more attribute-value pairs 164 included in the title structured information 200 may be generated by the network-based marketplace 106 responsive to parsing the text in the title 172 of the listing 170 using the classification rules 160. The one or more attribute-value pairs 164 included in the user configured structured information 202 may be identified based on a selection that is received from a user. For example, a seller may identify an item described by a listing 170 as being a particular brand by selecting the brand (e.g., APPLE) from a user interface to identify the attribute-value pair 164 (e.g., "BRAND=APPLE").

Figure 6I:
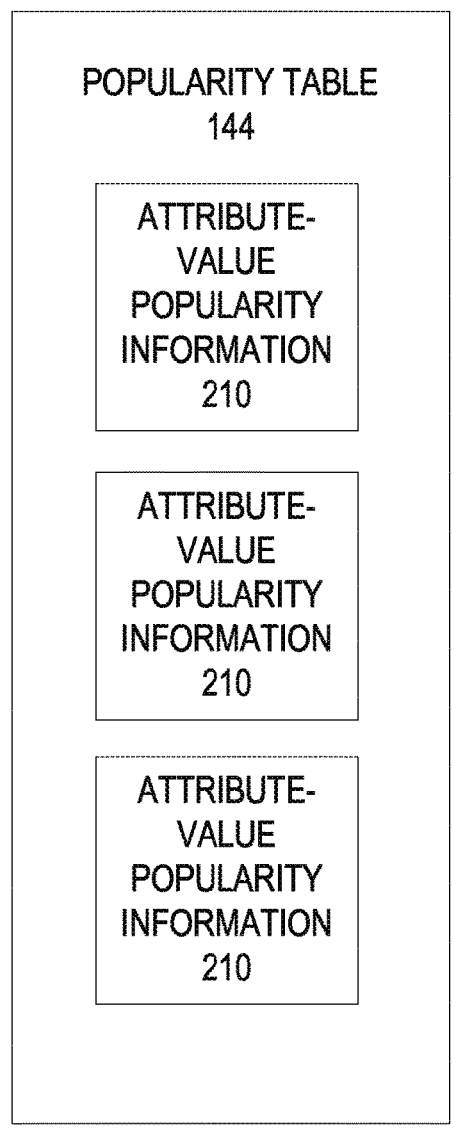
FIG. 6I illustrates a popularity table, according to an embodiment.

FIG. 6I illustrates the popularity table 144, according to an embodiment. The popularity table 144 may describe the attribute-value pairs 164/filters 66 and their relative popularity. Popular attribute-value pairs are associated with probabilities that are greater than probabilities associated with unpopular attribute-value pairs. The popularity table 144 may be generated based on a set of listings 170 that are identified as completed. The popularity table 144 may further be generated by extracting completed listings from the items table 142 based on a sale date 188. For example, popularity table 144 may further be generated by extracting completed listings 170 from the items table 142 based on a sale date 188 that is identified between a start-date and an end-date. The popularity table 144 may include multiple rows of attribute-value popularity information 210.

Figure 6J:
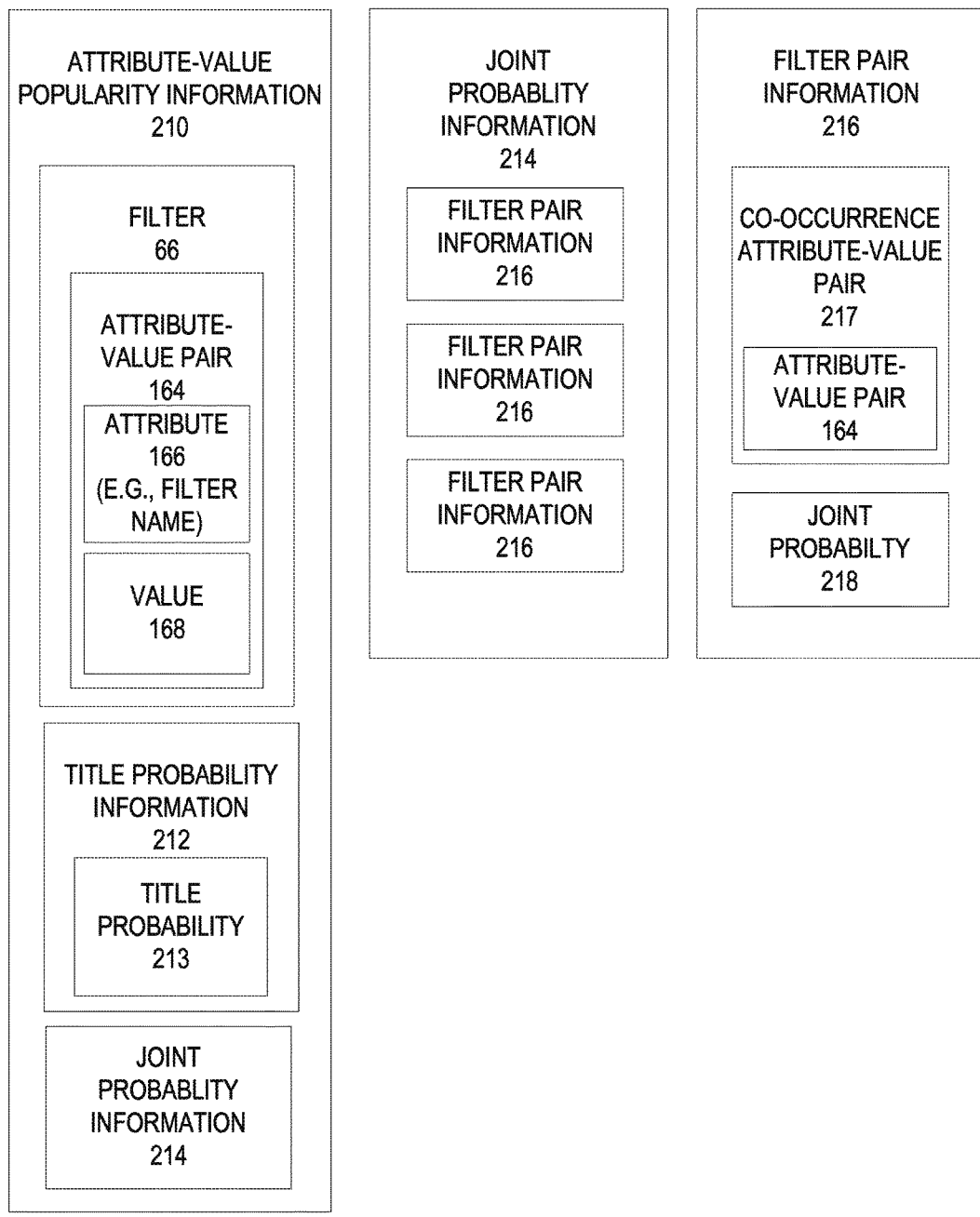
FIG. 6J illustrates attribute-value popularity information, according to an embodiment.

FIG. 6J illustrates the attribute-value popularity information 210, according to an embodiment. The attribute-value popularity information 210 may include the filter 66, title probability information 212, and joint probability information 214. The attribute-value popularity information 210 corresponds to a row in the popularity table 144 that, in turn, corresponds to the attribute-value pair 164 that functions as the filter 66 (e.g., "COLOR=RED"). The title probability information 212 may include a title probability 213 that stores the probability of identifying the attribute-value pair 164 in the title 172 of the listing 170 that is randomly selected from the set of completed listings that are extracted from the items table 142 to generate the popularity table 144. For example, the attribute-value popularity information 210 for the filter 66 "COLOR=RED" may be computed as 1% based on a set of 110,000 completed listings 170 including one-hundred listings 170 including titles 172 with the attribute-value pair 164 "COLOR=RED."

The joint probability information 214 may include multiple filter pair information 216 entries. The joint probability information 214 may be generated to include an entry of the filter pair information 216 responsive to identifying the occurrence of the present attribute-value pair 164 (e.g., filter 66) and another attribute-value pair 164 (e.g., co-occurrence attribute-value pair 217) in the title 172 of the listing 170 that is completed and utilized to generate the popularity table 144. The size of the joint probability information 214 is not prohibitive because most pairings of the attribute-value pairs 164 are not found in the title 172 of the listing 170. The filter pair information 216 may include a co-occurrence attribute-value pair 217 and a joint probability 218. For example, joint probability information 214 for the attribute-value pair 164 "COLOR=RED" may include four entries of filter-pair information 216 (e.g., (BRAND=APPLE, 5%) (TYPE=IPHONE, 3%) (CONDITION=NEW, 1%) (ITEM LOCATION=US, 1%).

Figure 6K:
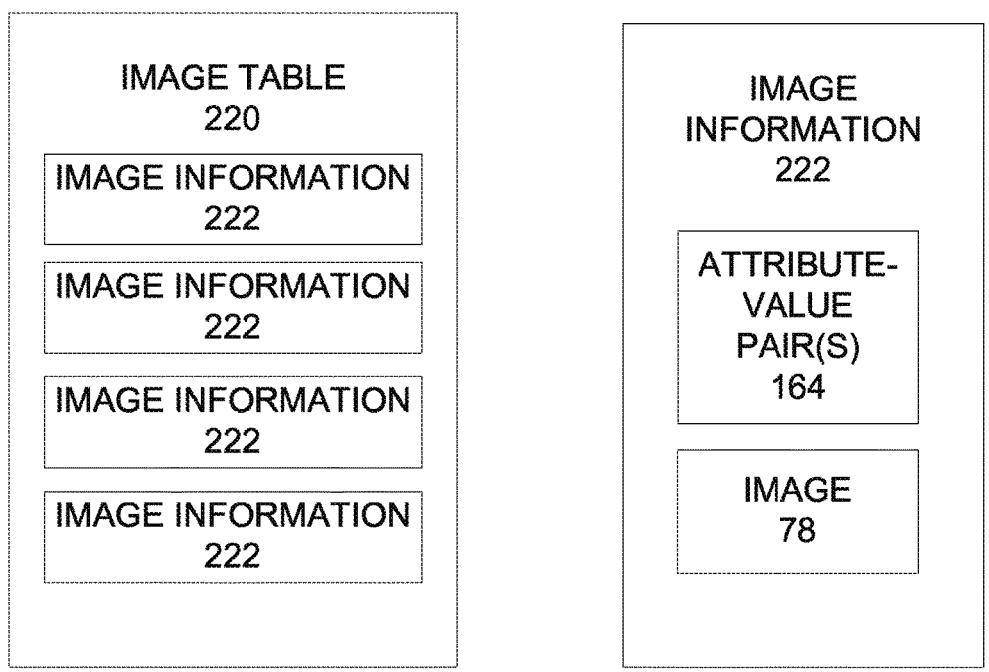
FIG. 6K illustrates an image table, according to an embodiment.

FIG. 6K illustrates an image table 220, according to an embodiment. The image table 220 may include multiple entries of image information 222. The image information 222 may include one or more attribute value pairs 164 that describe an associated image 78. For example, the attribute value pairs "COLOR=BLACK," "BRAND=APPLE," and "TYPE=IPHONE" may be associated with an image 78 of a black cellular phone that is called an "iPhone" that is manufactured by Apple, Inc. of Cupertino, Calif. Also for example, the attribute value pairs 164 "COLOR=RED," "BRAND=APPLE," and "TYPE=IPHONE" may be associated with an image 78 of a red cellular phone that is called an "iPhone" that is manufactured by Apple, Inc. of Cupertino, Calif.

Figure 7:
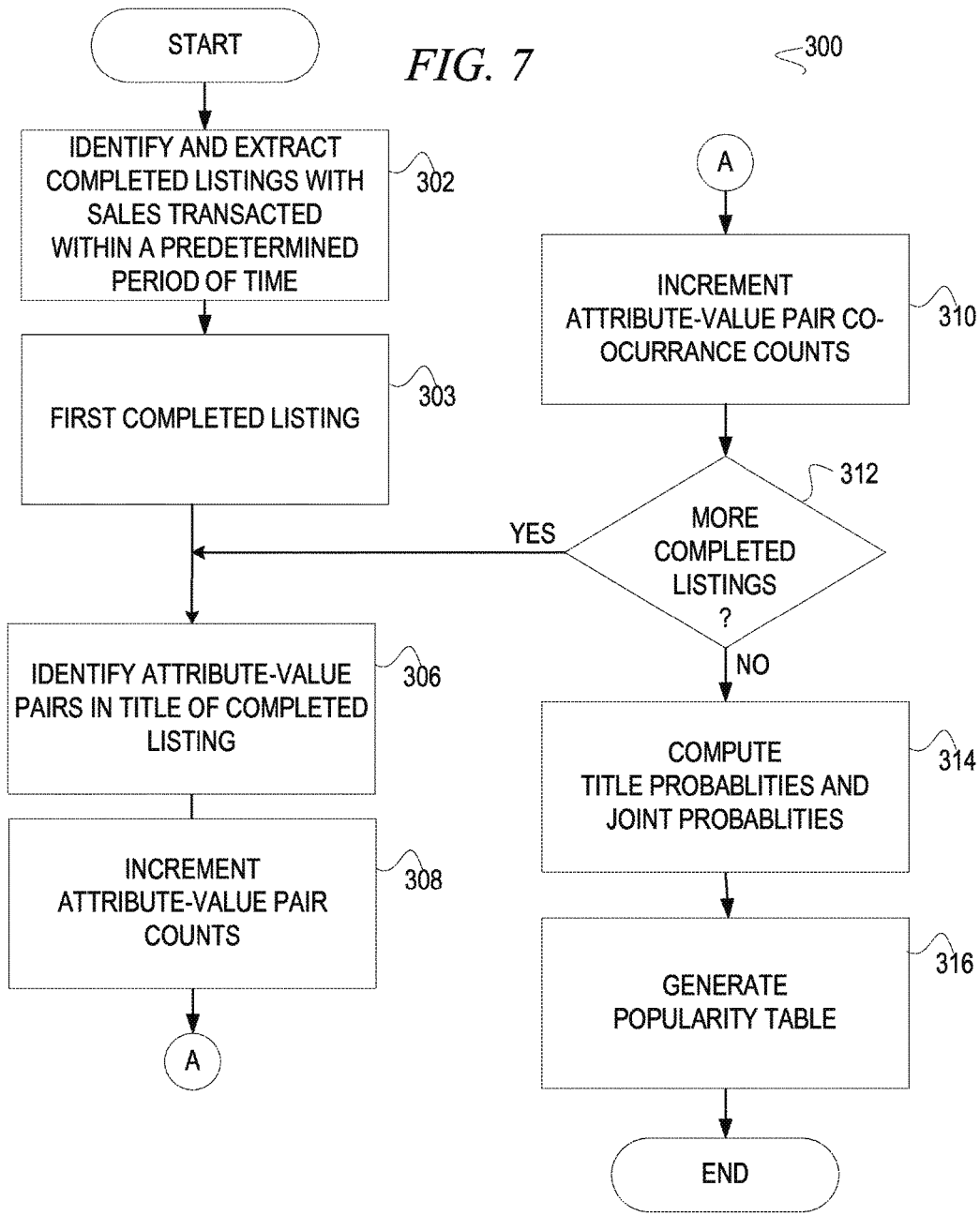
FIG. 7 illustrates a method to extract completed listings and generate a popularity table, according to an embodiment.

FIG. 7 illustrates a method 300 to extract completed listings and generate the popularity table 144, according to an embodiment. The method 300 may commence at operation 302 with the popularity module 128 identifying and extracting (e.g., copying) the listings 170 from the items table 142 that are completed. For example, the popularity module 128 may identify and extract (e.g., copy) the listings 170 between a predetermined start-date and a predetermined end date from the items table 142 to generate a set of completed listings. For example, responsive to identifying the listing 170 as including the asserted sale completed flag 186 (e.g., TRUE) and as including the sale date 188 between a predetermined start-date and predetermined end-date, the popularity module 128 may extract (e.g., copy) the listing 170 from the items table 142 to a set of completed listings.

In operations 303 through 312 the popularity module 128 processes the set of completed listings 170 that were extracted in operation 302. At operation 303, the popularity module 128 may advance to the first listing 170 in the set of completed listings. At operation 306, the popularity module 128 may identify attribute-value pairs 164 in the title 172 of the listing 170 that is completed. For example, the popularity module 128 may identify attribute-value pairs 164 in the title structured information 200 of the listing 170. At operation 308, the popularity module 128 may increment counts that are associated with attribute-value pairs 164 identified in the listing 170 that is completed. For example, the popularity module 128 may increment a count associated with the attribute value pair 164 "COLOR=RED" responsive to identifying the attribute value pair 164 "COLOR=RED" in the title 172. Likewise, the popularity module 128 may increment other counts responsive to identification of other attribute-value pairs being identified in the title 172. At operation 310, the popularity module 128 may increment counts that are associated with pairs of attribute-value pair 164 elements found in the title 172 of the listing 170 that is completed. For example, the popularity module 128 may increment a count associated with the pair of attribute value pair 164 elements "COLOR=RED" and "TYPE=CELL PHONE" responsive to a first pair of elements being identified in the title 172 (e.g., "RED APPLE IPHONE FOR SALE"). In a further example, the popularity module 128 may increment the count associated with the pair of attribute value pair 164 elements "COLOR=RED" and "BRAND=APPLE" responsive to a second pair of elements being identified in the same title 172 (e.g., "RED APPLE IPHONE FOR SALE"). Likewise, the popularity module 128 may increment other counts responsive to identification of other pairs of attribute-value pair 164 elements being identified in the title 172 of the listing 170 that is completed. According to one embodiment, the counts described in operations 308 and 310 may be implemented as a table with an X axis and a Y axis that are extended responsive to discovering a new type of attribute-value pair 164, the cells of the table being utilized to store the counts associated with identification of an attribute-value pair 164 in the title 172 and identification of the pair of attribute-value pair 164 elements in the title 172. For example, after processing one-hundred listings 170, a set of counts may appear as follows:

|  | "COLOR = RED" | "BRAND = APPLE" | "TYPE = IPHONE" |
| --- | --- | --- | --- |
| "COLOR = RED" | 10 | 1 | 2 |
| "BRAND = APPLE" | 1 | 12 | 3 |
| "TYPE = IPHONE" | 2 | 3 | 11 |

The cells associated with an intersection of an attribute-value pair 164 with itself (e.g., "COLOR=RED" and "COLOR=RED") may be used to store counts representing the number of times the attribute-value pair 164 was identified in the title 172. The cells associated with an intersection of the attribute-value pair 164 with another attribute-value pair 164 (e.g., "COLOR=RED" and "BRAND-APPLE") may be used to store counts representing the number of times the attribute-value pair 164 (e.g., "COLOR=RED") was identified with the second attribute-value pair 164 (e.g., "BRAND-APPLE") in the title 172. At decision operation 312, the popularity module 128 may identify whether more listings 170 are present in the set of completed listings. If more listings 170 are identified then the popularity module 128 may advance to the next listing 170 and branch to operation 306. Otherwise, processing continues at operation 314. At operation 314, the popularity module 128 may generate title probabilities and joint probabilities. For example, assume the above table represents the counts after one-hundred completed listings have been processed. The popularity module 128 may compute probabilities as follows:

|  | "COLOR = RED" | "BRAND = APPLE" | "TYPE = IPHONE" |
| --- | --- | --- | --- |
| "COLOR = RED" | 10/100 = 10% | 1/10 = 10% | 2/10 = 20% |
| "BRAND = APPLE" | 1/12 = 8% | 12/100 = 12% | 3/12 = 25% |
| "TYPE = IPHONE" | 2/11 = 18% | 3/11 = 27% | 11/100 = 11% |

The cells associated with an intersection of the attribute-value pair 164 with itself (e.g., "COLOR=RED" and "COLOR=RED") may be used to store the title probability 213 (e.g., representing the number of times the attribute-value pair 164 was identified in the title 172). The cells associated with the intersection of the attribute-value pair 164 with another attribute-value pair 164 (e.g., "COLOR=RED" and "BRAND-APPLE") may be used to store a joint probability 218, representing the number of times the attribute-value pair 164 (e.g., "COLOR=RED") was identified with the second attribute-value pair 164 (e.g., "BRAND-APPLE") in the title 172. At operation 316, the popularity module 128 may generate the popularity table 144 based on the above computations.

FIG. 8A illustrates a method 400 to identify a filter set in a query composed of keywords, according to an embodiment. Illustrated on the left are operations performed by the client machine 102, illustrated in the middle are operations performed by the front-end servers 108 in the network-based marketplace 106, and illustrated on the right are operations performed by the back-end servers 110 in the network-based marketplace 106. The method 400 may commence at operation 402 with the client machine 102 communicating a request including a query over the network 104 to the network-based marketplace 106. The query may include one or more keywords. For example, the client machine 102 may present the user interface 40, as illustrated in FIG. 2A, or the user interface 60, as illustrated in FIG. 2B, to receive a query or a query segment before communicating the request over the network 104 to the network-based marketplace 106.

At operation 404, the communication module 116 may receive the request and communicate the query to the search engine 121 at the back-end servers 110. At operation 406, the search engine 121 may receive and store the query. At operation 408, the search engine 121 may invoke the filter extraction module 122 which extracts filter sets from the query. For example, the filter extraction module 122 may parse the query by utilizing the classification rules 160 to identify and extract one or more filters 66 from the query. The filter extraction module 122 may extract multiple filter sets from the same query. For example, the filter extraction module 122 may utilize the search metadata 140 to parse the query "RED APPLE IPHONE" to identify the following four filter sets:

| FILTER SET |
|---|
| 1) COLOR = RED, BRAND = APPLE, TYPE = CELL PHONE |
| 2) COLOR = RED, BRAND = APPLE, TYPE = IPHONE |
| 3) COLOR = RED, PRODUCT = APPLE IPHONE |
| 4) POPULAR PRODUCT = RED APPLE IPHONE |

All of the above filter sets are well formed. Nevertheless, the filter extraction module 122 may identify one filter set from the above filter sets as popular based on the popularity table 144. Operation 408 is further described in FIG. 8B and FIG. 8C. At operation 410, the filter extraction module 122 may score each of the filter sets by utilizing probabilities that characterize the popularity of the filters 66 in the popularity table 144. For example, the filter sets may be scored as follows:

| FILTER SET | SCORE |
|---|---|
| 1) COLOR = RED, BRAND = APPLE, TYPE = CELL PHONE | 100 |
| 2) COLOR = RED, BRAND = APPLE, TYPE = IPHONE | 95 |
| 3) COLOR = RED, PRODUCT = APPLE IPHONE | 93 |
| 4) POPULAR PRODUCT = RED APPLE IPHONE | 80 |

Figure 8B:
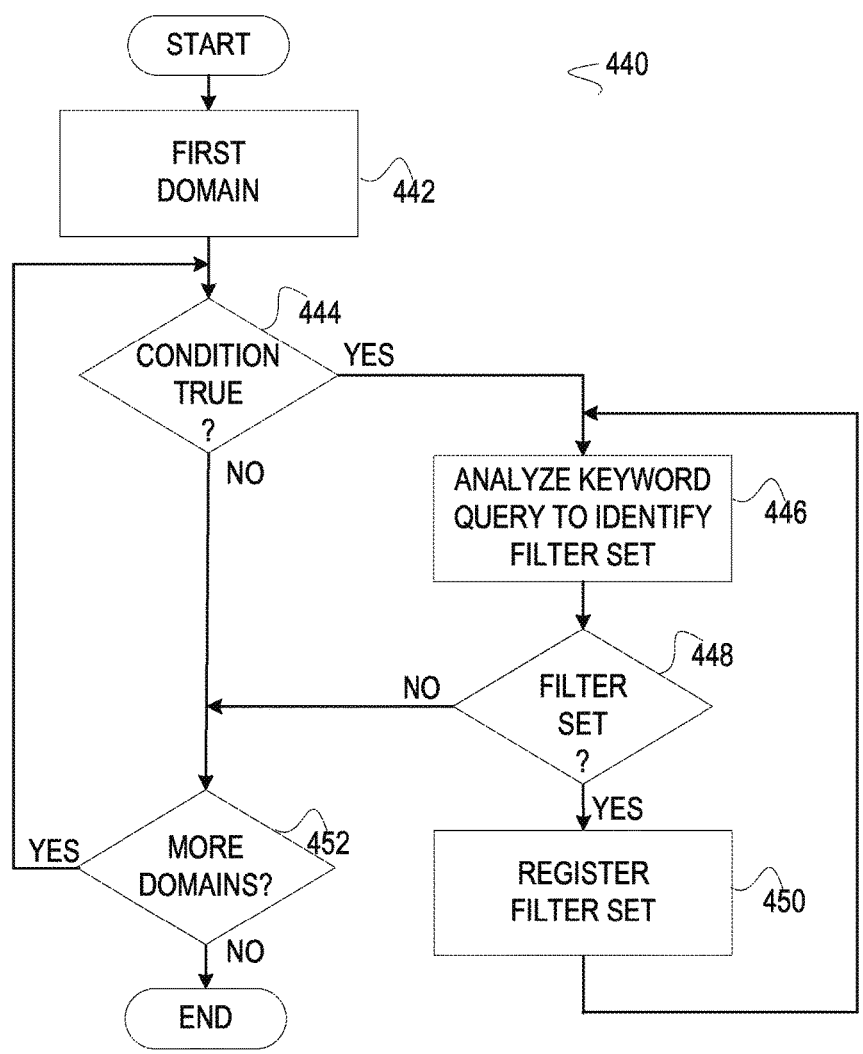
FIG. 8B illustrates a method to extract filter sets from a keyword query, according to an embodiment.
Figure 8C:
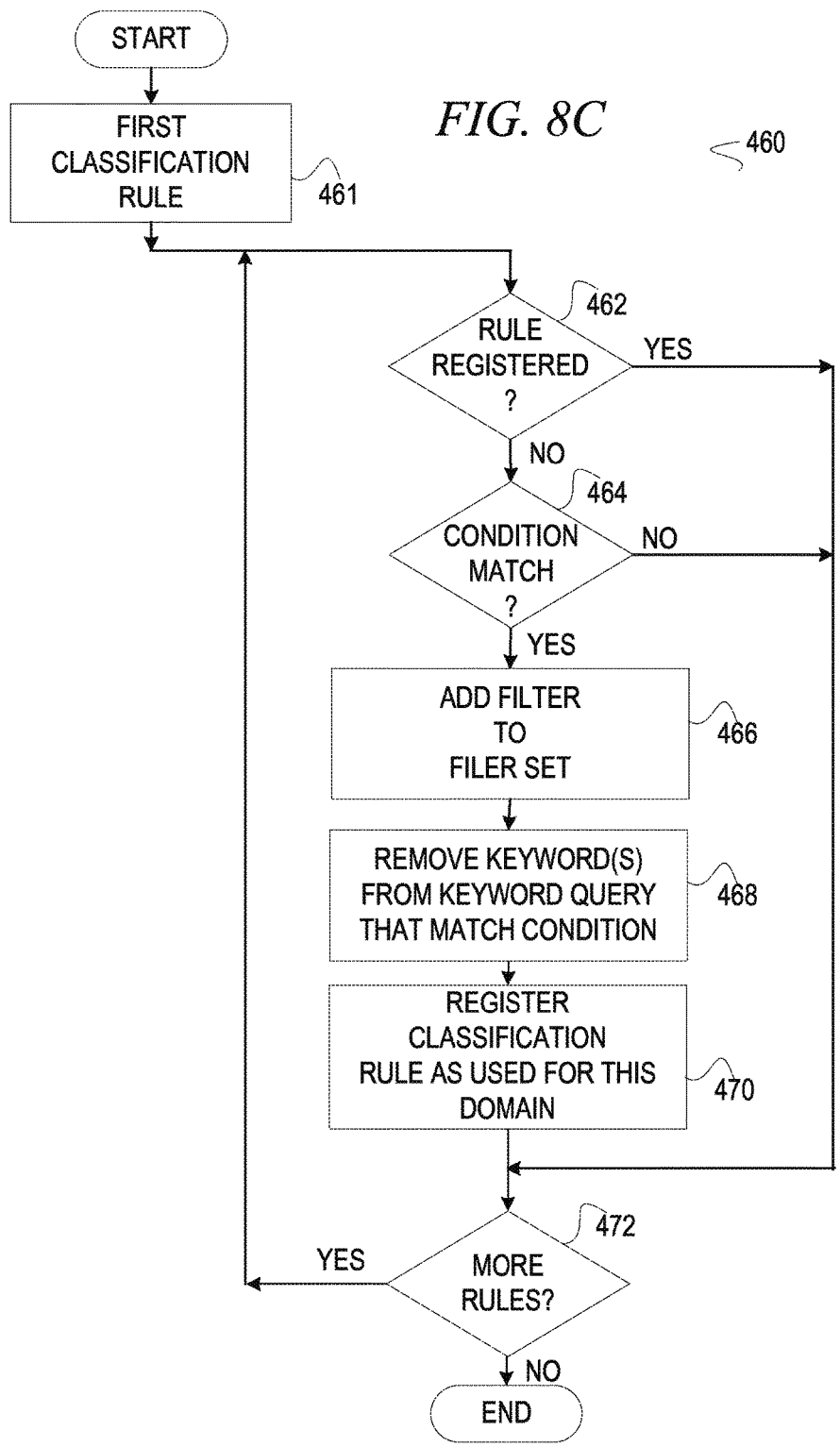
FIG. 8C illustrates a method to analyze a query, according to an embodiment.
Figure 8D:
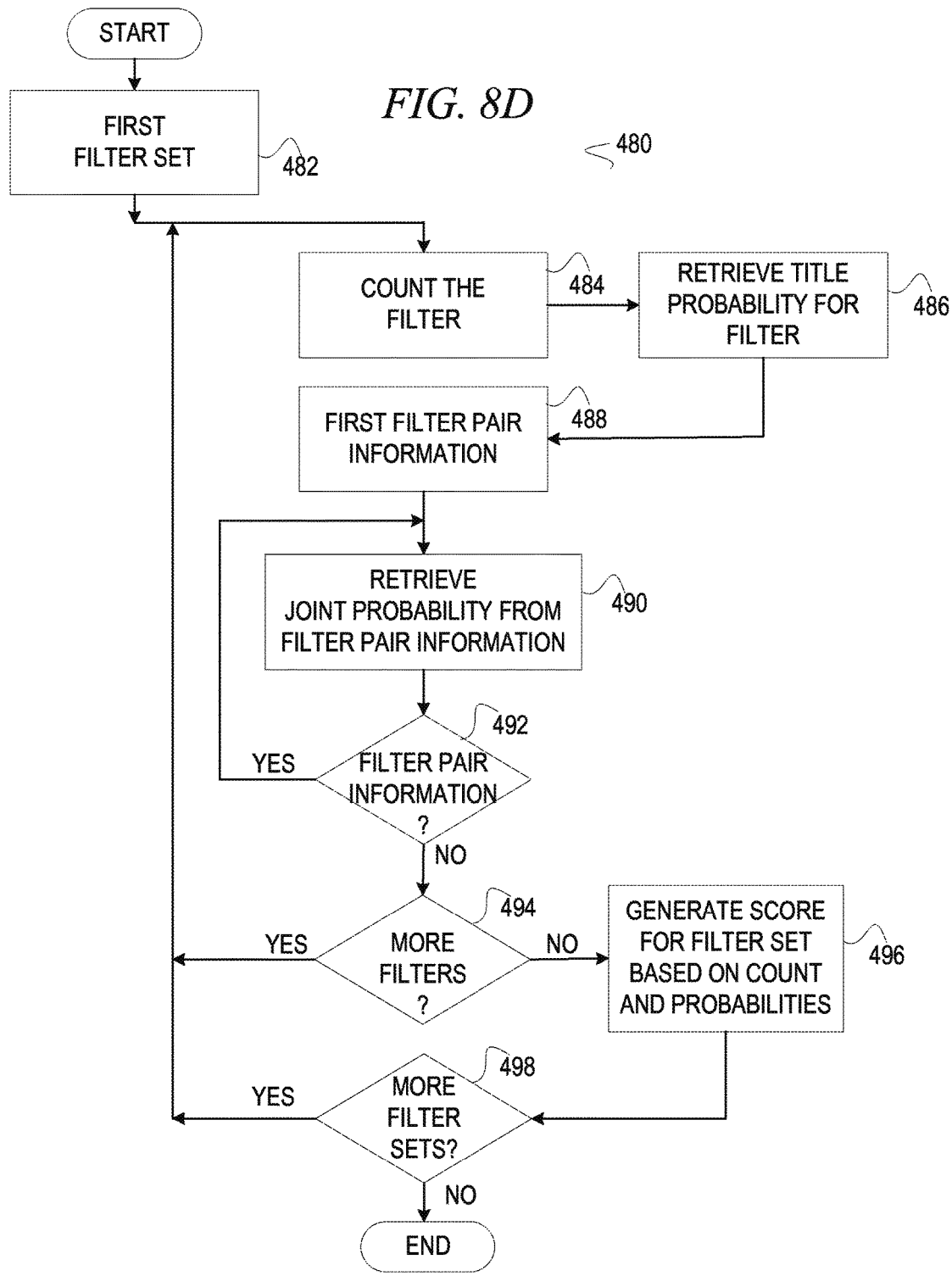
FIG. 8D illustrates a method to score filter sets, according to an embodiment.

Operation 410 is further described in FIG. 8D. At operation 412, the filter extraction module 122 may identify the filter set with the highest score (e.g., concept query 64 or the filter context 70). At operation 414, the filter extraction module 122 may generate the search results based on the filter set with the highest score. For example, the filter extraction module 122 may generate the search results by identifying listings 170 in the items table 142 that match the filters 66 in the filter set that was identified. In some cases, the filter extraction module 122 may not map every keyword in a query to the filter 66. In such cases, the filter extraction module 122 may identify the listings 170 in the items table 142 that match both the fitters 66 in the filter set with the highest score and the unmapped keywords in the query. At operation 416, the filter extraction module 122 may communicate the search results and the filter set with the highest score (e.g., concept query 64 or filter context 70) to the front-end servers 108. At operation 418, the communication module 116 may generate the appropriate user interface (e.g., user interface 40 or user interface 60) and communicate the user interface over the network 104 to the client machine 102. At operation 420, the client machine 102 may display the interface.

FIG. 8B illustrates a method 440 to extract filter sets from a query, according to an embodiment. The method 440 may commence, at operation 442, with the filter extraction module 122 advancing to the first domain information 150 in the search metadata 140. At decision operation 444, the filter extraction module 122 may compare the condition information 156 in the domain information 150 with the query to identify whether classification rules 160 for a particular domain (e.g., "Electronic Hand Held Devices") are to be applied to the query. For example, the filter extraction module 122 may compare the word (e.g., "IPHONE") in the condition information 156 in the domain information 150 with the words in the query (e.g., "APPLE IPHONE"). If the condition evaluates TRUE (e.g., match), then processing continues at operation 446. Otherwise, processing continues at decision operation 452. At operation 446, the filter extraction module 122 may identify whether the classification rules 160 associated with the present domain 152 match the query to identify a fitter set. It will be appreciated that multiple filter sets may be identified before advancing to the next domain 152. The operation 446 is further described in FIG. 8C. At decision operation 448, the filter extraction module 122 may identify whether a filter set was identified. If the filter set was identified then processing continues at operation 450. Otherwise, processing continues at decision operation 452. At operation 450, the filter extraction module 122 registers the filter set as being identified. At decision operation 452, the filter extraction module 122 may identify whether more domain information 150 is present in the search metadata 140. If more domain information 150 is present in the search metadata 140 then the filter extraction module 122 may advance to the next domain information 150 and processing continues at decision operation 444. Otherwise, the filter extraction module 122 may have extracted all filter sets from the query and processing ends.

FIG. 8C illustrates a method 460 to analyze a query, according to an embodiment. The method 460 may commence at operation 461 with the filter extraction module 122 in the search engine 121 advancing to the first classification rule 160 in the domain information 150, as previously identified in method 440, illustrated in FIG. 8B. Returning to FIG. 8C, at operation 462, the filter extraction module 122 may identify whether the classification rule 160 was previously registered as used (see operation 470). If the classification rule 160 was previously registered as used then a branch is made to decision operation 472 and processing continues. Otherwise, processing continues at decision operation 464. At decision operation 464, the filter extraction module 122 may compare the condition information 156 in the classification rule 160 with the query to identify a match. If the condition information 156 in the classification rule 160 (e.g., "IPHONE") matches one or more keywords in the query (e.g., "APPLE IPHONE") then processing continues at operation 466. Otherwise processing continues at decision operation 472. At operation 466, the filter extraction module 122 may add the filter 66 to the present filter set. For example, the filter extraction module 122 may supplement the filter set being processed with the filter 66 "TYPE=IPHONE" in the supplemental information 162 of the classification rule 160. At operation 468, the filter extraction module 122 may remove the keyword(s) from the query that match the condition information 156 in the classification rule 160 that is presently being processed. At operation 470, the filter extraction module 122 may register the classification rule 160 that is presently being processed as used in the domain 152 that is presently being processed. At decision operation 472, the filter extraction module 122 may identify whether more classification rules 160 are present in the domain 152. If more classification rules 160 are present then the filter extraction module 122 may advance to the next classification rule 160 and processing continues at decision operation 462. Otherwise, the filter extraction module 122 has finished a single pass of analyzing the query utilizing the classification rule information 154 for the present domain.

FIG. 8D illustrates a method 480 to score filter sets, according to an embodiment. The method 480 may commence at operation 482 with the filter extraction module 122 advancing to the first filter set. Recall, the filter extraction module 122 previously extracted a set of filter sets from the query by utilizing the classification rules 160. For example, the filter extraction module 122 may have extracted two filter sets from the query "RED APPLE IPHONE" as follows:

| FILTER SET NO. | FILTER SET |
|---|---|
| 1 | COLOR = RED, BRAND = APPLE, TYPE = CELL PHONE |
| 2 | COLOR = RED, PRODUCT = APPLE IPHONE |

At operation 484, the filter extraction module 122 may count the filter 66 (e.g., COLOR=RED) in the filter set that is presently being processed (e.g., first filter set). At operation 486, the filter extraction module 122 may retrieve the title probability 213 from the probability table 144 for the filter 66 that is presently being processed. For example, the filter extraction module 122 may identify the attribute-value popularity information 210 entry in the probability table 144 with the filter 66 (e.g., COLOR=RED) that matches the filter 66 that is being processed (e.g., COLOR=RED) and retrieve the title probability 213 from the identified attribute-value popularity information 210 entry. At operation 488, the filter extraction module 122 may advance to the first filter pair information 216 entry in the identified attribute-value popularity information 210. At operation 490, the fitter extraction module 122 may retrieve the joint probability 218 from the filter pair information 216 that is being processed. At decision operation 492, the filter extraction module 122 may identify whether more filter pair information 216 entries are present in the filter pair information 216 of the filter 66 that is being processed. If another entry of filter pair information 216 is present then a branch is made to operation 490 to process the next filter pair information 216. Otherwise, processing continues at decision operation 494. At decision operation 494, the filter extraction module 122 may identify whether more filters 66 (e.g., BRAND=APPLE) are present in the filter set that is currently being processed. If more filters 66 are present then the filter extraction module 122 advances to the next filter 66 before branching to operation 484. Otherwise, processing proceeds to operation 496. At operation 496, the filter extraction module 122 may generate a score for the filter set that is presently being processed. For example, the filter extraction module 122 may generate a score based on the number of filters in the filter set, the title probabilities 213 of the filter set, and the joint probabilities 218 of the filter set.

According to one embodiment, the filter extraction module 122 may generate a score for the filter sets by utilizing native Bayesian probabilities. According to one embodiment, the filter extraction module 122 may sum the probabilities and the count of filters to generate a score. For example, the filter extraction module 122 may add the number of filters, the title probabilities, and the joint probabilities to generate a score. According to another embodiment, the filter extraction module 122 may apply a weight to each type of information before summing the information. For example, the filter extraction module 122 may multiply the number of filters by a coefficient; multiply the title probabilities by a coefficient; and multiply the joint probabilities by a coefficient; followed by adding the three types of information together. According to one embodiment, the coefficients may be configurable by a user. According to one embodiment, the filter extraction module 122 may apply weights to the probabilities and the count as described above before multiplying the respective results to generate a score. At decision operation 498, the filter extraction module 122 may identify whether more filter sets (e.g., COLOR=RED, PRODUCT=APPLE IPHONE) are to be processed. If more filter sets are to be processed then the filter extraction module 122 advances to the next filter set at operation 484. Otherwise, the method 480 ends.

FIG. 9A illustrates a method 500 to identify and present filters, according to an embodiment. Illustrated on the left are operations performed by the client machine 102, illustrated in the middle are operations performed by the front-end servers 108 in the network-based marketplace 106, and illustrated on the right are operations performed by the back-end servers 110 in the network-based marketplace 106. The method 500 may commence at operation 502 with the client machine 102 communicating a request including a query to over the network 104 to the network-based marketplace 106. The query may include one or more keywords. For example, the client machine 102 may present the user interface 40, as illustrated in FIG. 2A, or the user interface 60, as illustrated in FIG. 2B, before receiving and communicating the query over the network 104 to the network-based marketplace 106.

The operations 504-512 correspond to operations 404-412 in FIG. 8A and the extended descriptions in FIGS. 8B-8D. Accordingly, the description of operations 404-412 in FIG. 8A and the extended descriptions in FIGS. 8B-8D is the same for operations 504-512 in FIG. 9A. At operation 514, the search engine 121 may utilize the identified set of filters in the form of the filter context 70 (e.g., first plurality of filters) to identify an order of presentation for the filter context 70, as illustrated and described in the user interface 40 in FIG. 3B, according to an embodiment. The search engine 121 may identify the order of presentation for the filter context 70 based on the popularity table 144. For example, the search engine 121 may identify the filters 66 "COLOR=RED" and "BRAND=APPLE" are to be presented, from top to bottom of the user interface 40, in the order "COLOR=RED" and "BRAND=APPLE," The operation 514 is described further in method 530 on FIG. 9B.

Returning to FIG. 9A, at operation 516, the search engine 121 may identify a second plurality of filters and an order of their presentation on the user interface 40 as the filter proposal 72, as illustrated and described in user interface 40 in FIG. 3B. For example, the search engine 121 may invoke the filter name module 124 with the filter context 70 COLOR=RED, BRAND=APPLE to identify a second plurality of fitters 66 that are most popular and an order of their presentation, the filters including attributes 166 (e.g., filter names). The fitter name module 124 may identify the filter names that are most popular and an order of their presentation based the popularity table 144. The operation 516 is described further in method 540 in FIG. 9C.

At operation 518, the search engine 121 may generate the search results based on the filter context 70. For example, the search engine 121 may generate the search results to include descriptions of the listings 170 by identifying the listings 170 in the items table 142 with the structured information 176 that match the filter context 70. In some cases, the search engine 121 may not map every keyword in a query to the filter 66. In such cases, the search engine 121 may identify listings 170 in the items table 142 that match both the filter set and the remaining keywords.

At operation 520, the search engine 121 may communicate the search results and the filter context 70 to the front-end servers 108. At operation 522, the communication module 116 may generate an interface and communicate the interface over the network 104 to the client machine 102. For example, the communication module 116 may generate the user interface 40 on FIG. 3B, according to an embodiment. According to one embodiment, the communication module 116 may be configured to identify a predetermined number of filters 66 for display. According to one embodiment, the communication module 116 may be configured to identify a total of five filters comprised of both the filter context 70 and the filter proposals 72, as illustrated in user interface 40 on FIG. 3B. For example, the communication module 116 may identify for display the two filters that were selected by the user and the three filters from the first three rows of the sort, as illustrated in user interface 40 on FIG. 3B, to combine with the predetermined number of five. Further, the communication module 116 may identify for display the order of the filters 66 on the user interface from top to bottom and the order of their respective values from top to bottom based on the previously described sorts, according to an embodiment. For example, the communication module 116 may identify for display the order of the filters 66 on the user interface from top to bottom and the order of their respective values from top to bottom based on the previously described sorts as illustrated in user interface 40 on FIG. 311, according to an embodiment.

At operation 524, the client machine 102 may display the interface (e.g., user interface).

FIG. 9B illustrates a method 530 to identify an order of filters in the filter context 70, according to an example embodiment. The method 530 may commence at operation 532 with the search engine 121 identifying rows in the popularity table 144 that match the filters 66 in the filter context 70. If, for example, the filter context 70 includes the filters 66 "COLOR=RED," "BRAND=APPLE" (e.g., user interface 40 in FIG. 3B) then the search engine 121 may identify the two rows (e.g., attribute-value popularity information 210) in the popularity table 144 with the same filters 66.

At operation 534, the search engine 121 may sort the identified two rows of attribute-value popularity information 210 to maximize the title probabilities 213 and the joint probabilities 218. For example, the search engine 121 may utilize native Bayesian probabilities to identify the rows that maximize the probabilities. According to one embodiment, the search engine 121 may sum the title probabilities 213 and the joint probabilities 218 for each row e.g., attribute-value popularity information 210) to generate a score and sort the rows based on the scores. According to another embodiment, the search engine 121 may apply a weight to each type of probability before scoring and sorting. For example, the search engine 121 may multiply the title probability in a row by a coefficient, multiply each of the co-occurrence probabilities in the row by a coefficient, and add the two products together to generate a score for a row that is utilized to sort the rows. According to one embodiment, the search engine 121 may multiply the two products together to generate a score for a row that is utilized to sort the rows. According to one embodiment, the coefficients may be configurable by a user.

At operation 536, the search engine 121 may identify an order of presentation of the filters 66 in the filter context 70 based on the order of the sorted rows. If, for example, the rows corresponding to the filters 66 "BRAND=APPLE" and "COLOR=RED" were to be sorted into the order "COLOR=RED" followed by "BRAND=APPLE," (e.g., from highest to lowest scores) then the filters 66 are presented on a user interface from the top to the bottom in the order "COLOR=RED," and "BRAND=APPLE" accordance with the highest score. For example, the order "COLOR=RED," and "BRAND=APPLE" are illustrated in accordance with the order of a sort in user interface 40 in FIG. 3B.

Returning to FIG. 9B, at operation 538, the search engine 121 may advance to the first row in the above mentioned sort (e.g., corresponds to the first filter 66 "COLOR=RED"). At operation 539, the search engine 121 may identify the values and their order of display for the filter 66 (e.g., row) that is presently being processed by invoking the filter value module 126 with the name of the filter 66 and the filter context 70. The operation 539 is described further in FIG. 9E.

At decision operation 541, the search engine 121 may identify whether more rows (filters 66) are present in the sort. If more rows (filters 66) are present in the sort, then the search engine 121 advances to the next row in the sort and a branch is made to operation 539. Otherwise, the method 530 ends.

FIG. 9C illustrates a method 540 to identify filters in the filter proposal 72 and their order of presentation, according to an embodiment. The method 540 may commence at operation 542 with the search engine 121 invoking the filter name module 124 with the filter context 70. Responsive to receiving the filter context 70, the filter name module 124 may identify rows in the popularity table 144 (e.g., attribute-value popularity information 210) that include non-zero joint probabilities 218 for each of the filters 66 in the filter context 70. If for example a filter context 70 includes the filters 66 "COLOR=RED" and "BRAND=APPLE" then the filter name module 124 may identify rows in the popularity table 144 with non-zero joint probabilities 218 for the filters 66 "COLOR=RED" and "BRAND=APPLE."

At operation 544, the filter name module 124 may sort the identified rows of attribute-value popularity information 210 to maximize the title probabilities 213 and the joint probabilities 218 in each row, as described in operation 534. At operation 546, the filter name module 124 may identify a set of unique filter names (e.g., attributes 166) and an order of presentation from the sorted rows of attribute-value popularity information 210. For example, consider TABLE 1 in FIG. 9D. TABLE 1 includes six rows of the attribute-value popularity information 210 that were sorted to maximize the title probabilities 213 (not shown) and the joint probabilities 218 (e.g., row 1 maximizes). The filter name module 124 may extract rows with duplicate filter names (e.g., attributes 166) from rows illustrated in TABLE 1 to generate TABLE 2. Accordingly, the filter name module 124 may identify a set of unique filter names in an order.

Returning to FIG. 9C, at operation 548, the search engine 121 may advance to the first row in the above mentioned sort (e.g., corresponds to the first filter 66 "TYPE=CELL PHONE"). At operation 550, the search engine 121 may identify the values and their order of display for the filter 66 (e.g., row) that is presently being processed by invoking the filter value module 126 with the name of the filter 66 (e.g., attribute 166) (e.g., "TYPE") and the filter context 70. The operation 550 is described further in FIG. 9E.

At decision operation 552, the search engine 121 may identify whether more rows (filters 66) are present in the above mentioned sort. If more rows (filters 66) are present in the sort then the search engine 121 advances to the next row in the sort followed by a branch to operation 550. Otherwise, the method 540 ends.

Figure 9E:
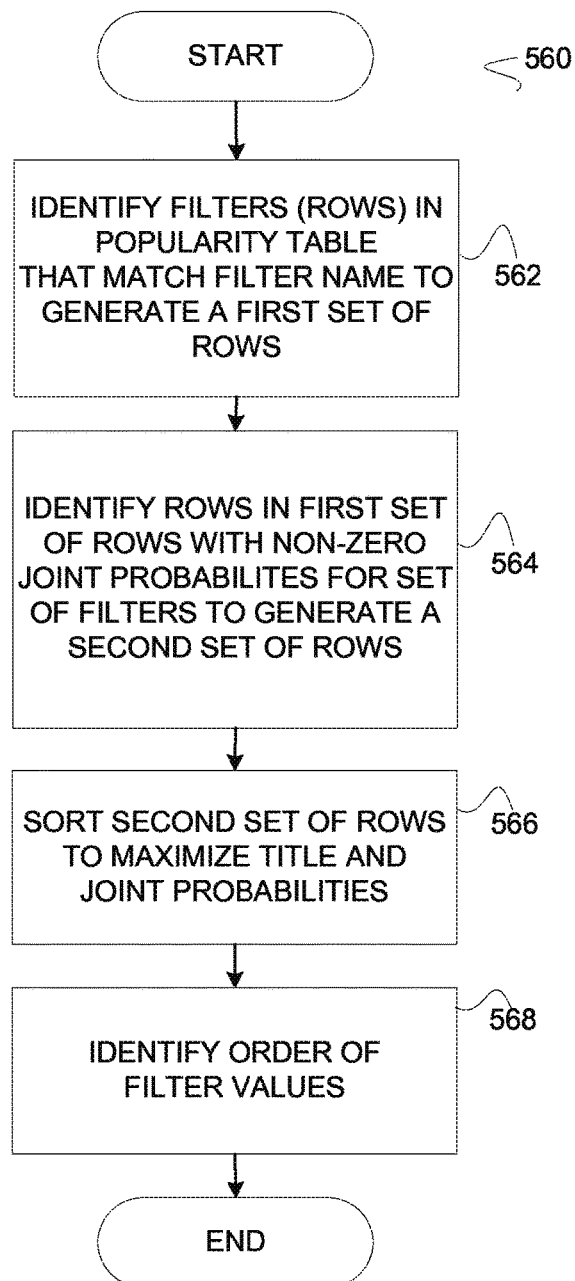
FIG. 9E illustrates a method to identify an ordered set of values for a filter name, according to an embodiment.

FIG. 9E illustrates a method 560 to identify an ordered set of values 168 for a filter name. The method 560 may commence at operation 562 with the filter value module 126 receiving the filter name e.g., attribute 166) (e.g., "COLOR") and the set of filters 66. For example, the set of filters 66 may include the filters 66 in the filter context 70 or the filters 66 in the concept query 64 (e.g., "COLOR=BLACK," "BRAND=APPLE," "TYPE=IPHONE"). Continuing with operation 562, the filter value module 126 may identify a first set of rows (e.g., attribute-value popularity information 210) in the popularity table 144 with the filters 66 that include the attributes 166 that match the filter name (e.g., "COLOR") received by the filter value module 126. If, for example, the filter name received by the filter value module 126 is "COLOR," then all rows that include the filters 66 with the attribute 166 "COLOR" are identified as matched. For example, consider TABLE 3 in FIG. 9F, according to an embodiment. FIG. 9F may illustrate at least six rows of attribute-value popularity information 210 in the popularity table 144. The filter name module 124 may extract rows from TABLE 3 in FIG. 9F that include attributes the 166 that match the filter name "COLOR" to generate a first set of rows, as illustrated in TABLE 4, according to an embodiment.

Returning to FIG. 9E, at operation 564, the filter value module 126 may identify a second set of rows from the first set of rows based on the set of filters 66 received by the filter value module 126. For example, the filter value module 126 may identify a second set of rows from the first set of rows where each row includes anon-zero joint probability 218 corresponding to the filters 66 in the set of filters 66 received by the filter value module 126. For example, assume the filter value module 126 received the set of filters 66 "COLOR=BLACK," "BRAND=APPLE," "TYPE=IPHONE." The filter value module 126 may identify rows five and six, as illustrated in TABLE 5 of FIG. 9G, according to an embodiment, because both rows include anon-zero joint probability 218 for the filter 66 "BRAND=APPLE" and the filter 66 "TYPE=IPHONE." Note that row 1 from TABLE 4 in FIG. 9F was not included in the results because it included the joint probability 218 for the attribute-value pair 164 "BRAND=APPLE" of zero.

Returning to FIG. 9E, at operation 566, the ft ter value module 126 may sort the identified rows of attribute-value popularity information 210 to maximize the title probabilities 213 and the joint probabilities 218. For example, the filter value module 126 may utilize native Bayesian probabilities to identify the rows that maximize the probabilities 213, 218. According to one embodiment, the filter value module 126 may sum the title probabilities 213 and the joint probabilities 218 for each row (e.g., attribute-value popularity information 210) to generate a score and sort the rows based on the scores. According to another embodiment, the filter value module 126 may apply a weight to each type of probability before scoring and sorting. For example, the filter value module 126 may multiply the title probability 213 in a row by a coefficient, multiply each of the joint probabilities 218 in the row by a coefficient, and add the products together to generate a score for a row that is utilized to sort the rows. According to one embodiment, the filter value module 126 may multiply the products together to generate a score for a row that is utilized to sort the rows. According to one embodiment, the coefficients may be configurable by a user. At operation 568, the filter value module 126 may identify the order of the filter values. For example, the order of the filter values may be identified based on the result of the sort in operation 566 (e.g. first row=highest score, second row=second highest score).

FIG. 10A illustrates a method 600 to identify values 168 for a selected filter, according to an embodiment. Illustrated on the left are operations performed by the client machine 102, illustrated in the middle are operations performed by the front-end servers 108 in the network-based marketplace 106, and illustrated on the right are operations performed by the back-end servers 110 in the network-based marketplace 106. Prior to commencing the method 600, the network-based marketplace 106 may process a selection of a fitter "COLOR=RED" in the concept query 64 (e.g., "COLOR=RED," "BRAND=APPLE," and "TYPE=IPHONE") to generate the user interface 60, as illustrated in FIG. 4A. The user interface 60 is shown to illustrate the value panel 76 presenting a set of colors (e.g., values 168) "RED," "BLACK," "BLUE" "YELLOW" AND "PURPLE."

The method 600 may commence at operation 602 with the client machine 102 receiving and communicating a request including a selection that identifies the filter 66 (e.g., "COLOR=BLACK") over the network 104 to the network-based marketplace 106. For example, as illustrated in FIG. 4A and FIG. 10A, a user may select "BLACK" from the value panel 76 of the user interface 60 identifying the filter 66 "COLOR=BLACK" and causing the client machine 102 to communicate a request including a first attribute-value pair 164 "COLOR=BLACK" to the network-based marketplace 106.

At operation 604, at the network-based marketplace 106, the communication module 116 at the front-end servers 108 may receive and communicate the selection to the back-end servers 110. At operation 606, the search engine 121, at the back-end servers 110, may receive the selection. At operation 608, the search engine 121 may identify values and their order of display for the filter 66 (COLOR=BLACK) by invoking the filter value module 126 with the name of the filter 66 (e.g., attribute 166) (e.g., "COLOR") and the concept query (e.g., "COLOR=BLACK," "BRAND=APPLE," and "TYPE=IPHONE"). The filter value module 126 may identify values for the filter name "COLOR" and an order of their presentation based on the concept query 64. For example, the filter value module 126 may identify, order, and return a plurality of filters as follows: "COLOR=BLUE," "COLOR=YELLOW," "COLOR=PURPLE," "COLOR=GREEN," etc. that respectively include a plurality of values "BLUE," "YELLOW," "PURPLE," "GREEN," etc. The operation 608 may further be described in FIG. 9E.

At operation 610, the search engine 121 may generate search results, as previously described, based on the concept query 64 "COLOR=BLACK," "BRAND=APPLE," and "TYPE=IPHONE," At operation 612, the search engine 121 may communicate the search results and the plurality of filters (e.g., "COLOR=BLUE," "COLOR=YELLOW," "COLOR=PURPLE," "COLOR=GREEN") to the front-end servers 108.

At operation 614 the front-end servers 108 may generate a user interface (e.g., user interface 60) based on the first plurality of filter values and the concept query 64. For example, the concept query 64 may be updated to include the filters 66 "COLOR=BLACK," "BRAND APPLE," and "TYPE=IPHONE." As illustrated in FIG. 4B, the images 78 may be identified for the values in the value panel 76 and a user interface generated. At operation 614, the communication module 116 may generate an interface. For example, the communication module 116 may generate the user interface 60, as illustrated in FIG. 4B. The operation 614 is further described in FIG. 10B. At operation 616, the client machine 102 may receive and display the user interface.

Figure 10B:
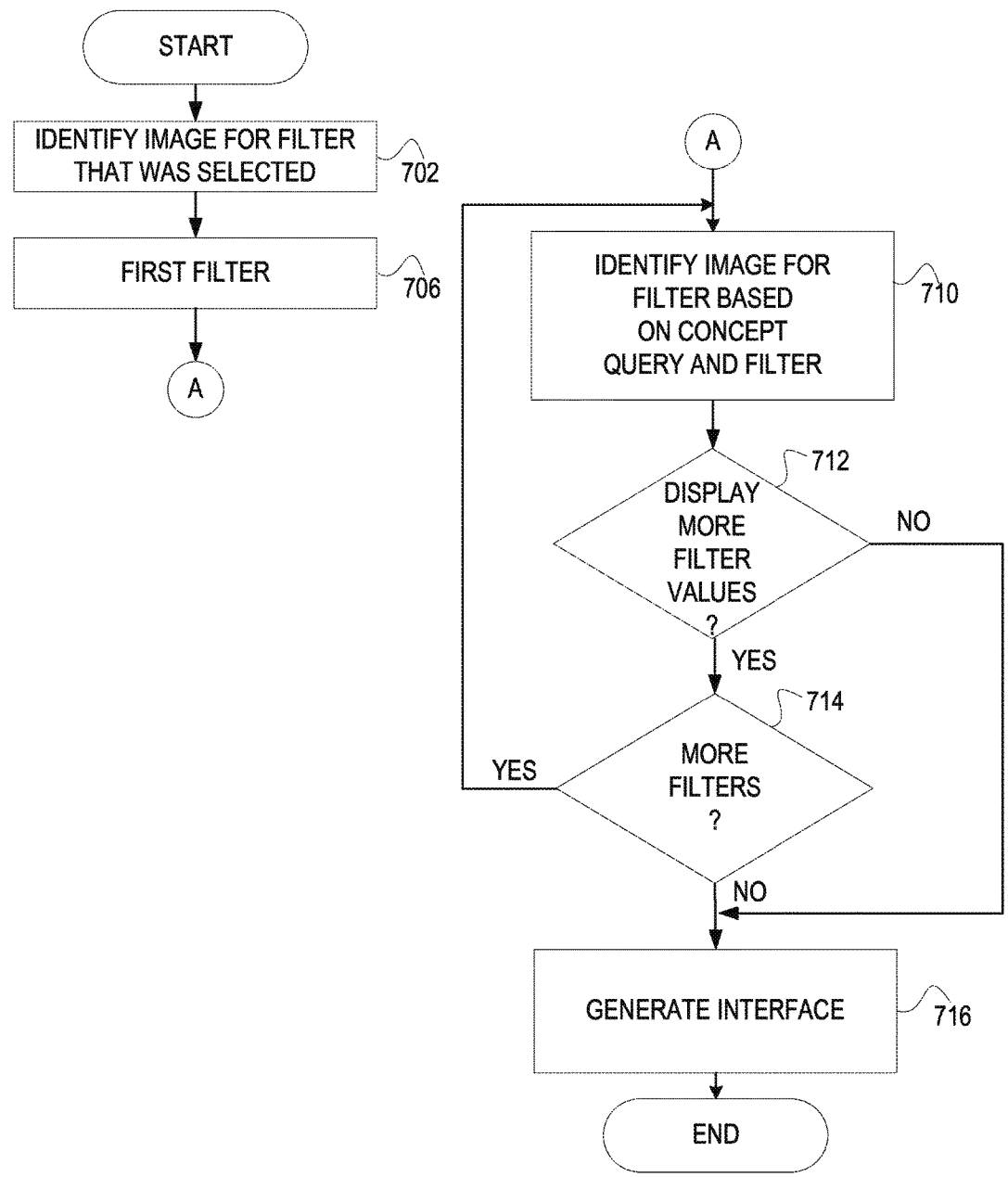
FIG. 10B illustrates a method to generate an interface, according to an embodiment.

FIG. 10B illustrates a method 700 to generate an interface including filter values and images, according to an embodiment. The method 700 may commence at operation 702 with the communication module 116 identifying the image 78 for the filter 66 that was selected. For example, the communication module 116 may identify the image information 222 in the image table 220 that includes attribute-values pairs 164 that match the filter 66 that was selected, "COLOR=BLACK," and the other filters 66 in the concept query 64, "BRAND=APPLE," "TYPE=IPHONE." Responsive to identifying the match, the communication module 116 may retrieve the associated image 78 (e.g., black Apple iPhone).

At operation 706, the communication module 116 may identify the first filter 66. For example, the communication module 116 may identify the first row (e.g., highest sorted priority) (ROW1—"COLOR=BLUE") of the rows of the attribute-value popularity information 210 that were previously identified by the filter value module 126. Recall that the filter value module 126 identified and sorted a set of rows of attribute-value popularity information 210 where each row corresponds to the filter 66, as described in FIG. 9E.

Returning to FIG. 10B, at operation 710, the communication module 116 may identify the image 78 for the filter 66 that is being processed and the other filters 66 in the concept query 64. For example, the communication module 116 may identify image information 222 in the image table 220 that includes attribute-values pairs 164 that match the concept query 64 "BRAND=APPLE," "TYPE=IPHONE" and the present filter (e.g., "COLOR=BLUE").

At decision operation 712, the communication module 116 may identify whether more filters 66 (e.g., rows) are to be processed based on a predetermined threshold. For example, the predetermined threshold may be five (e.g., "COLOR=BLACK," "COLOR=BLUE," "COLOR=YELLOW," "COLOR=PURPLE," COLOR=GREEN"), as illustrated in FIG. 4B. If more filters 66 are to be displayed on the user interface then processing continues with the next filter 66 (e.g., row) at decision operation 714. Otherwise, processing continues at operation 716. At operation 716, the communication module 116 may generate an interface based on the search results, the values for the filters 66, the images 78 associated with the filters 66, and the concept query 64. For example, the communication module 116 may generate the user interface 60, as illustrated on FIG. 4B.

Figure 11:
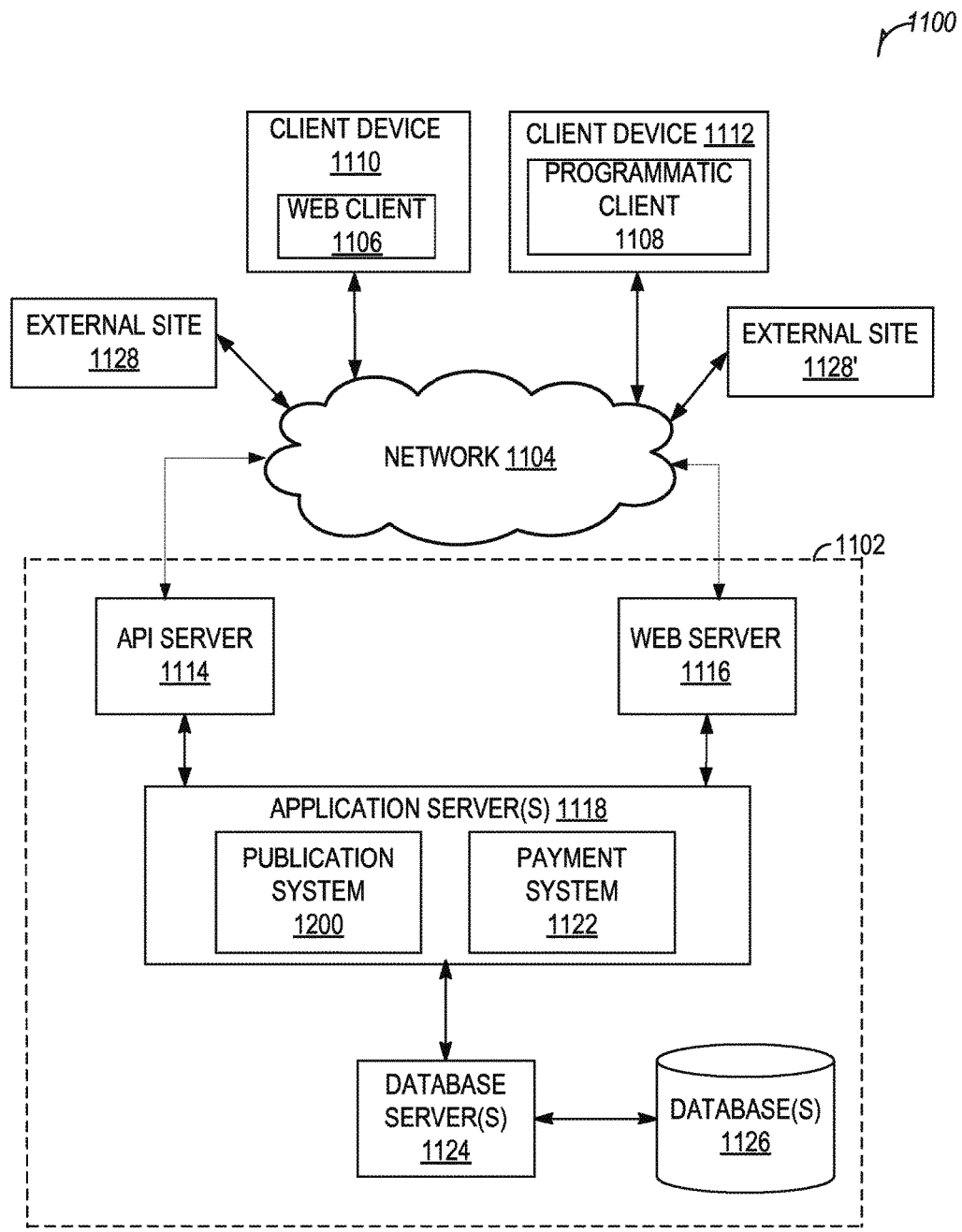
FIG. 11 is a block diagram illustrating an example embodiment of a high-level client-server-based network architecture.

FIG. 11 illustrates a network architecture 1100, according to an embodiment. A networked system 1102, in an example form of a network-server-side functionality, is coupled via a communication network 1104 (e.g., the Internet, wireless network, cellular network, or a Wide Area Network (WAN)) to one or more client devices 1110 and 1112. The networked system 1102 corresponds to the system 100 in FIG. 5, the communication network 1104 corresponds to the network. 104 in FIG. 5, and the client devices 1110 and 1112 correspond to the client machines 102 in FIG. 5, accordingly, the same or similar references have been used to indicate the same or similar features unless otherwise indicated. FIG. 11 illustrates, for example, a web client 1106 operating via a browser (e.g., such as the INTERNET EXPLORER® browser developed by Microsoft® Corporation of Redmond, Wash. State), and a programmatic client 1108 executing on respective client devices 1110 and 1112.

The network architecture 1100 may be utilized to execute any of the methods described in this document. The client devices 1110 and 1112 may comprise a mobile phone, desktop computer, laptop, or any other communication device that a user may utilize to access the networked system 1102. In some embodiments, the client device 1110 may comprise a display module (not shown) to display information (e.g., in the form of user interfaces). In further embodiments, the client device 1110 may comprise one or more of a touch screen, accelerometer, camera, microphone, and GPS device. The client devices 1110 and 1112 may be a device of a user that is used to perform a transaction involving digital goods within the networked system 1102. In one embodiment, the networked system 1102 is a network-based marketplace that manages digital goods, publishes publications comprising item listings of products available on the network-based marketplace, and manages payments for these marketplace transactions. Additionally, external sites 1128, 1128' may be sites coupled to networked system 1102 via network 1104. External sites may be any desired system, including ecommerce systems.

An Application Program Interface (API) server 1114 and a web server 1116 are coupled to, and provide programmatic and web interfaces respectively to, one or more application servers 1118. The application server(s) 1118 host a publication system 1200 and a payment system 1122, each of which may comprise one or more modules, applications, or engines, and each of which may be embodied as hardware, software, firmware, or any combination thereof. The application servers 1118 are, in turn, coupled to one or more database servers 1124 facilitating access to one or more information storage repositories or database(s) 1126. In one embodiment, the databases 1126 are storage devices that store information to be posted (e.g., publications or listings) to the publication system 1200. The databases 1126 may also store digital goods information in accordance with example embodiments.

In example embodiments, the publication system 1200 publishes content on a network (e.g., Internet). As such, the publication system 1200 provides a number of publication and marketplace functions and services to users that access the networked system 1102. The publication system 1200 is discussed in more detail in connection with FIG. 12. In example embodiments, the publication system 1200 is discussed in terms of an online marketplace environment. However, it is noted that the publication system 1200 may be associated with a non-marketplace environment such as an informational (e.g., search engine) or social networking environment.

The payment system 1122 provides a number of payment services and functions to users. The payment system 1122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 1200 or elsewhere on the network 1104. The payment system 1122 also facilitates payments from a payment mechanism (e.g., a bank account, PayPal™, or credit card) for purchases of items via any type and form of a network-based marketplace.

While the publication system 1200 and the payment system 1122 are shown in FIG. 11 to both form part of the networked system 1102, it will be appreciated that, in alternative embodiments, the payment system 1122 may form part of a payment service that is separate and distinct from the networked system 1102. Additionally, while the example network architecture 1100 of FIG. 11 employs a client-server architecture, a skilled artisan will recognize that the present disclosure is not limited to such an architecture. The example network architecture 1100 can equally well find application in, for example, a distributed or peer-to-peer architecture system. The publication system 1200 and payment system 1122 may also be implemented as standalone systems or standalone software programs operating under separate hardware platforms, which do not necessarily have networking capabilities.

Figure 12:
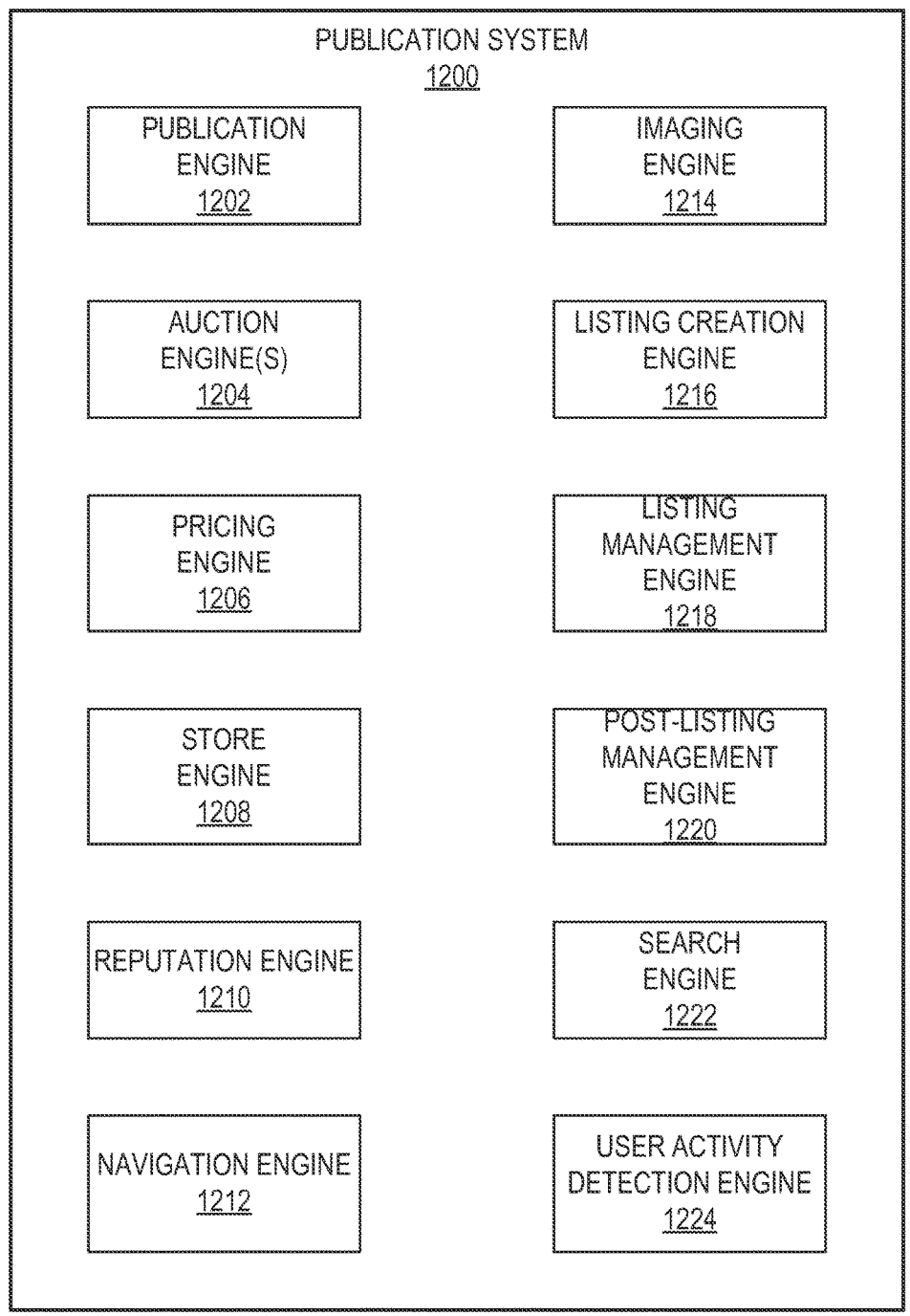
FIG. 12 is a block diagram illustrating an example embodiment of a publication system.

Referring now to FIG. 12, an example block diagram illustrating multiple components that, in one embodiment, are provided within the publication system 1200 of the networked system 1102 is shown. In this embodiment, the publication system 11200 is a marketplace system where items (e.g., goods or services) may be offered for sale and that further implements the features described herein for interactive query generation and refinement. The items may comprise digital goods (e.g., currency, license rights). The publication system 1200 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 1126 via the one or more database servers 1124, as shown in FIG. 11.

Returning to FIG. 12, the publication system 1200 provides a number of publishing, listing, and price-setting mechanisms whereby a buyer may list (or publish information concerning) goods or services for sale, a buyer can express interest in or indicate a desire to purchase such goods or services, and a price can be set for a transaction pertaining to the goods or services. To this end, the publication system 1200 may comprise at least one publication engine 1202 and one or more auction engines 1204 that support auction-format listing and price setting mechanisms e.g., English, Dutch, Chinese, Double, Reverse auctions, etc.).

A pricing engine 1206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 1208 allows a buyer to group listings within a "virtual" store, which may be branded and otherwise personalized by and for the buyer. Such a virtual store may also offer promotions, incentives, and features that are specific and personalized to the buyer. In one example, the buyer may offer a plurality of items as Buy-It-Now items in the virtual store, offer a plurality of items for auction, or a combination of both.

A reputation engine 1210 allows users that transact, utilizing the networked system 1102, to establish, build, and maintain reputations. These reputations may be made available and published to potential trading partners. Because the publication system 1200 supports person-to-person trading between unknown entities, in accordance with one embodiment, users may otherwise have no history or other reference information whereby the trustworthiness and credibility of potential trading partners may be assessed. The reputation engine 1210 allows a user, for example through feedback provided by one or more other transaction partners, to establish a reputation within the network-based marketplace 106 over time. Other potential trading partners may then reference the reputation for purposes of assessing credibility and trustworthiness.

Navigation of the network-based marketplace 106 may be facilitated by a navigation engine 1212. For example, a browse module (not shown) of the navigation engine 1212 allows users to browse various category, catalog, or inventory data structures according to which listings may be classified within the publication system 1200. Various other navigation applications within the navigation engine 1212 may be provided to supplement the browsing applications. For example, the navigation engine 1212 may include the communication module 116, as previously described.

In order to make listings available via the networked system 1102 as visually informing and attractive as possible, the publication system 1200 may include an imaging engine 1214 that enables users to upload images for inclusion within publications and to incorporate images within viewed listings. The imaging engine 1214 may also receive image data from a user as a search query and utilize the image data to identify an item depicted or described by the image data.

A listing creation engine 1216 allows users (e.g., buyers) to conveniently author listings of items. In one embodiment, the listings pertain to goods or services that a user (e.g., a buyer) wishes to transact via the publication system 1200. In other embodiments, a user may create a listing that is an advertisement or other form of publication.

A listing management engine 1218 allows the users to manage such listings. Specifically, where a particular user has authored or published a large number of listings, the management of such listings may present a challenge. The listing management engine 1218 provides a number of features (e.g., auto-relisting, inventory level monitors, etc.) to assist the user in managing such listings. The listing management engine 1218 may include the listing module 118, as previously described.

A post-listing management engine 1220 also assists users with a number of activities that typically occur post-listing. For example, upon completion of a transaction facilitated by the one or more auction engines 1204, a buyer may wish to leave feedback regarding a particular seller. To this end, the post-listing management engine 1220 provides an interface to the reputation engine 1210 allowing the buyer to conveniently provide feedback regarding multiple sellers to the reputation engine 1210. Another post-listing action may be shipping of sold items whereby the post-listing management engine 1220 may assist in printing shipping labels, estimating shipping costs, and suggesting shipping carriers.

A search engine 1222 performs searches for publications in the networked system 1102 that match a query. In example embodiments, the search engine 1222 comprises a search module (not shown) that enables keyword searches of publications published via the publication system 1200. Further, for example, the search engine 1222 may perform the functions previously described in reference to the search engine 121. In a further embodiment, the search engine 1222 may take an image received by the imaging engine 1214 as an input for conducting a search. The search engine 1222 takes the query input and determines a plurality of matches from the networked system 1102 (e.g., publications stored in the database 1126). It is noted that the functions of the search engine 1222 may be combined with the navigation engine 1212. The search engine 1222, in the publication system 1200, may perform the functionality previously described with respect to the search engine 121.

A user activity detection engine 1224 in FIG. 12 may monitor user activity during user sessions and detect a change in the level of user activity that, as discussed in more detail below, may predict that a user is about to make a purchase. The exact amount of change in the level of user activity may vary. A general guideline may be to monitor across multiple sessions and detect any significant increase over time (for example the activity level doubling or tripling in a short span), in one embodiment, when the user activity detection engine 1224 detects such a condition, the ecommerce system may make an intervention to provide content for display to the user in an effort to improve the probability that the user will make a purchase, and/or also to motive the user to make the purchase on the ecommerce system site instead of moving to a competitor site in search of a better purchase. Stated another way, activity over time and at different times before a purchase action provides an opportunity to personalize marketing to a user, based on time, by intervention as discussed above. Additional examples of including a temporal frame in that marketing personalization are discussed below. The publication system 1200 may further include the popularity module 128, as previously described.

Although the various components of the publication system 1200 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 1200 have been included in FIG. 12. In general, components, protocols, structures, and techniques not directly related to functions of exemplary embodiments (e.g., dispute resolution engine, loyalty promotion engine, personalization engines) have not been shown or discussed in detail. The description given herein simply provides a variety of exemplary embodiments to aid the reader in an understanding of the systems and methods used herein.

Data Structures

Figure 13:
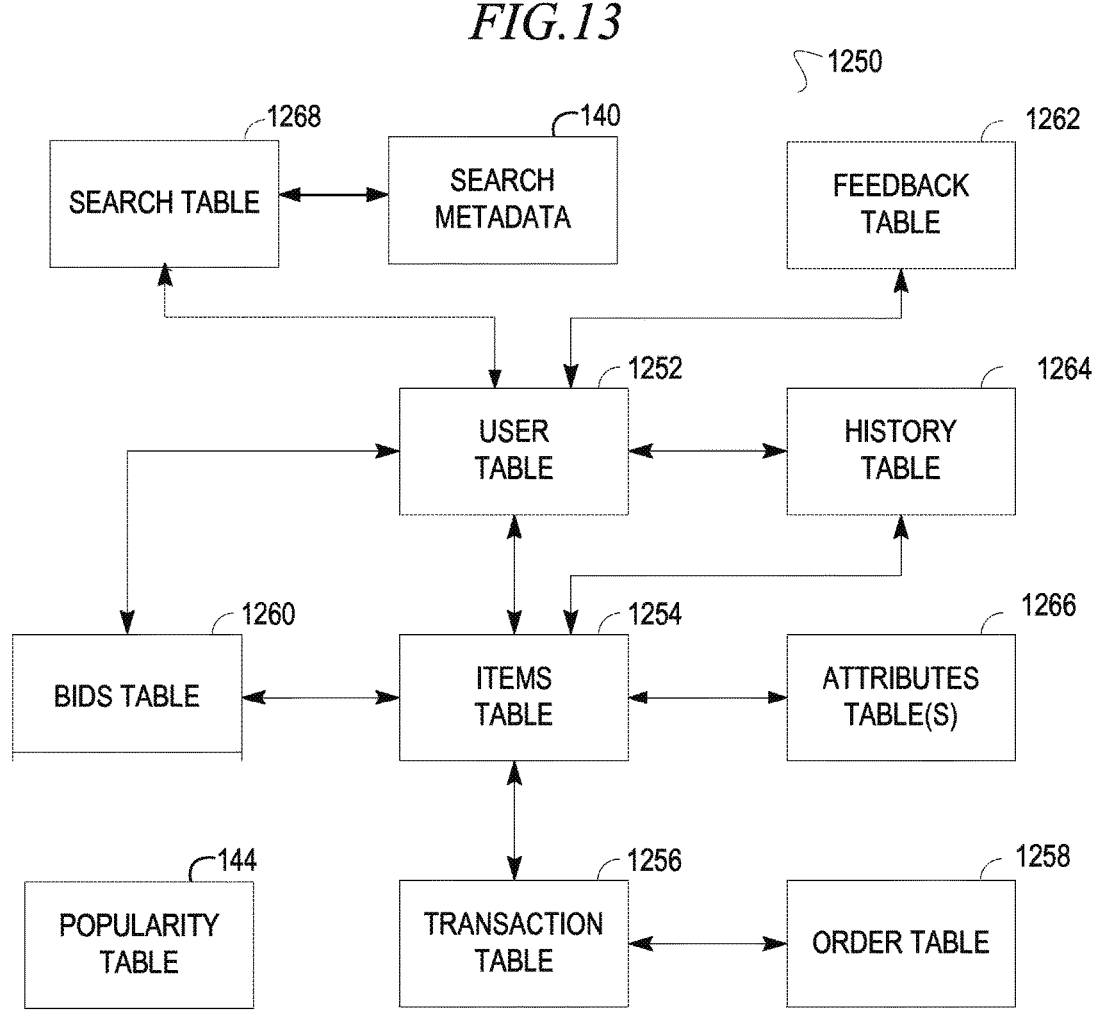
FIG. 13 is a block diagram illustrating tables that are utilized by the publication system, according to an embodiment.
Figure 14:
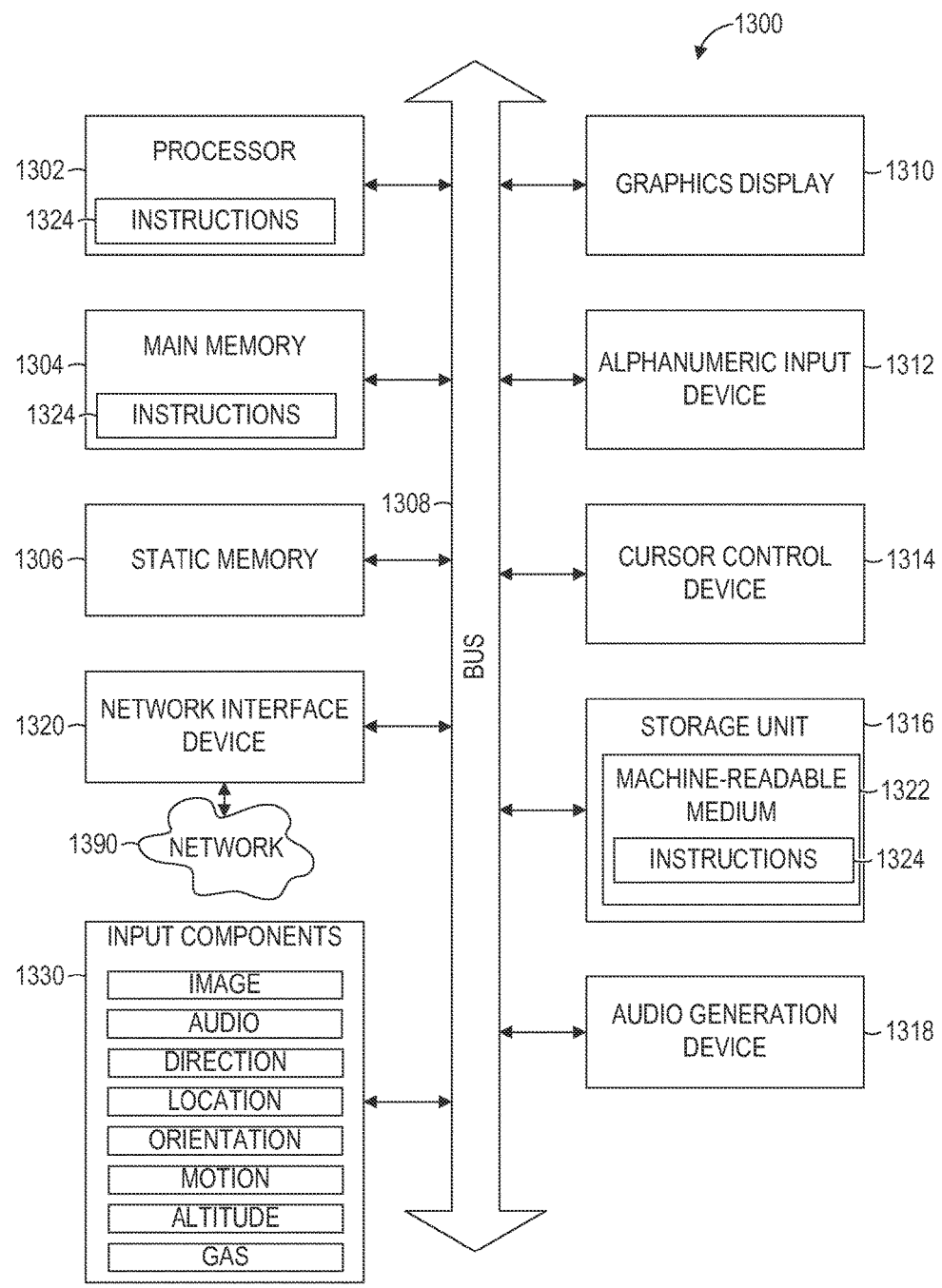
FIG. 14 is a block diagram of a machine in an example form of a computing system within which a set of instructions for causing the machine to perform any one or more of the methodologies discussed herein may be executed.

FIG. 13 is a high-level entity-relationship diagram, illustrating various tables 1250 that may be maintained within the databases 1126 of FIG. 11, and that are utilized by and support the publication system 1200 and payment system 1122, both of FIG. 11. A user table 1252 may contain a record for each of the registered users of the networked system 1102 (e.g., network-based marketplace 106) of FIG. 11 and FIG. 5. A user may operate as a seller, a buyer, or both, within the network-based marketplace 106 (e.g., FIG. 11 and FIG. 5). In one example embodiment, a buyer may be a user that has accumulated value (e.g., commercial or proprietary currency), and is accordingly able to exchange the accumulated value for items that are offered for sale by the network-based marketplace 106.

The tables 1250 may also include an items table 1254 (e.g., items table 142) in which item records (e.g., listings) maintained for goods and services (e.g., items) that are available to be, or have been, transacted via the network-based marketplace 106. Item records (e.g., listings) within the items table 1254 may furthermore be linked to one or more user records within the user table 1252, so as to associate a seller and one or more actual or potential buyers with an item record (e.g., listing).

A transaction table 1256 may contain a record for each transaction (e.g., a purchase or sale transaction or auction) pertaining to items for which records exist within the items table 1254.

An order table 1258 may be populated with order records, with each order record being associated with an order. Each order, in turn, may be associated with one or more transactions for which records exist within the transaction table 1256.

Bid records within a bids table 1260 may relate to a bid received at the network-based marketplace 106 in connection with an auction-format listing supported by the auction engine(s) 1204 of FIG. 12. A feedback table 1262 may be utilized by one or more reputation engines 1210 of FIG. 12, in one example embodiment, to construct and maintain reputation information concerning users in the form of a feedback score. A history table 1264 may maintain a history of transactions to which a user has been a party. One or more attributes tables 1266 may record attribute information that pertains to items for which records exist within the items table 1254. Considering only a single example of such an attribute, the attributes tables 1266 may indicate a currency attribute associated with a particular item, with the currency attribute identifying the currency of a price for the relevant item as specified by a seller. A search table 1268 may store search information that has been entered by a user (e.g., a buyer) who is looking for a specific type of listing. The tables 1250 may include the popularity table 144 and the search metadata 140, both as previously described.

Machine

FIG. 15 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 1390 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1330 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions 1324. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as afield programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

We claim:

1. A system comprising:
   one or more processors; and
   a machine-readable hardware storage device coupled with the one or more processors, the machine-readable hardware storage device storing instructions that, when executed by the one or more processors, cause the system to perform operations comprising:
   receiving a query, over a network, from a client machine, the query including at least one keyword;
   applying, to the received query, classification rules that are each associated with one or more defined domains to identify a plurality of filter sets that are each applicable to the received query, each applicable filter set in the identified plurality of applicable filter sets including at least one attribute-value pair determined to correspond to at least a portion of the received query;

generating a score for each applicable filter set in the identified plurality of applicable filter sets based on a determined number of times that the applicable filter set corresponds to titles of previously-transacted item listings of a network-based marketplace;

selecting a first filter set from the identified plurality of filter sets based on a determination that the first filter set is associated with a highest generated score of the scores generated for each of the identified plurality of applicable filter sets; and employing the selected first filter set to generate search results for item listings offered on the network-based marketplace, the search results being generated for communication, over the network, to the client machine as a response to the received query.

2. The system of claim 1, wherein each of the applied classification rules includes corresponding condition information that is comparable to one or more portions of the received query, and corresponding supplemental information that includes one or more filter sets.

3. The system of claim 1, wherein each filter set of the included one or more filter sets comprises at least a first corresponding attribute-value pair.

4. The system of claim 3, wherein each filter set further comprises a second corresponding attribute-value pair, and the score for each applicable filter set in the identified plurality of applicable filter sets is generated based further in part on a determined probability that the first corresponding attribute-value pair co-occurs with the second corresponding attribute-value pair.

5. The system of claim 1, wherein the generated score corresponds to a probability that the applicable filter set in the identified plurality of applicable filter sets corresponds to one of the plurality of item listings offered on the network-based marketplace.

6. The system of claim 1, wherein the score for each applicable filter set in the identified plurality of applicable filter sets is generated based further in part on a number of filters in the applicable filter set.

7. A method performed by at least one processor, comprising:

receiving a query, over a network, from a client machine, the query including a set of keywords;

applying, to the received query, classification rules that are each associated with one or more defined domains to identify a plurality of applicable filter sets, each filter set of the identified plurality of applicable filter sets comprising at least one attribute-value pair determined to correspond to at least one keyword in a set of keywords included the received query;

generating a score for each applicable filter set in the identified plurality of applicable filter sets based on a determined probability that the at least one attribute-value pair of the applicable filter set corresponds to titles of previously-transacted item listings of a network-based marketplace;

generating search results from a plurality of item listings offered on the network-based marketplace by employing one of the identified plurality of applicable filter sets determined to have a highest generated score, wherein the search results are generated for communication, over the network, to the client machine as a response to the received query.

8. The method of claim 7, wherein each of the applied classification rules includes corresponding condition information that is comparable to one or more portions of the received query, and corresponding supplemental information that includes one or more filter sets.

9. The method of claim 7, wherein each filter set of the included one or more filter sets comprises at least a first corresponding attribute-value pair.

10. The method of claim 9, wherein each filter set further comprises a second corresponding attribute-value pair, and the score for each applicable filter set in the identified plurality of applicable filter sets is generated based further in part on a determined probability that the first corresponding attribute-value pair co-occurs with the second corresponding attribute-value pair.

11. The method of claim 7, wherein the score for each applicable filter set in the identified plurality of applicable filter sets is generated based further in part on a number of filters in the applicable filter set.

12. The method of claim 7, wherein at least one applicable filter set of the identified plurality of applicable filter sets includes a first corresponding attribute-value pair comprising an attribute of color and a value indicating the color.

13. A non-transitory machine-readable hardware storage device storing a set of instructions that, when executed by a processor of a machine, causes the machine to perform operations comprising:

receiving a query, over a network, from a client machine, the query including a set of keywords;

applying, to the received query, classification rules that are each associated with one or more defined domains to identify a plurality of applicable filter sets, each filter set of the identified plurality of applicable filter sets comprising at least one attribute-value pair determined to correspond to at least one keyword in the set of keywords of the received query;

generating a score for each applicable filter set in the identified plurality of applicable filter sets based on a determined probability that the at least one attribute-value pair of the applicable filter set corresponds to titles of previously-transacted item listings of a network-based marketplace; and generating search results from a plurality of item listings offered on the network-based marketplace by employing one of the identified plurality of applicable filter sets determined to have a highest generated score, wherein the search results are generated for communication to the client machine over the network as a response to the received query.

14. The non-transitory machine-readable hardware storage device of claim 13, wherein the score for each applicable filter set in the identified plurality of applicable filter sets is generated generating based further in part on a number of filters in the applicable filter set.

15. The system of claim 1, wherein the search results are generated based on a set of offered item listings determined to correspond to the selected first filter set.

* * * * *

UNITED STATES PATENT AND TRADEMARK OFFICE
CERTIFICATE OF CORRECTION

PATENT NO. : 10,210,262 B2
APPLICATION NO. : 14/460728
DATED : February 19, 2019
INVENTOR(S) : Tolga Konik et al.

Page 1 of 1

It is certified that error appears in the above-identified patent and that said Letters Patent is hereby corrected as shown below:

On the Title Page

Item (57), in Column 2, in "Abstract", Line 4, after "and" delete "a".

Item (57), in Column 2, in "Abstract", Line 6, after "at" delete "the".

In the Claims

In Column 34, Line 56, in Claim 14, after "generated" delete "generating".

Signed and Sealed this
Twenty-first Day of July, 2020

Andrei Iancu
*Director of the United States Patent and Trademark Office*